(12) United States Patent
Asano

(10) Patent No.: US 11,280,996 B2
(45) Date of Patent: Mar. 22, 2022

(54) LIGHT SOURCE UNIT AND PROJECTION DISPLAY APPARATUS

(71) Applicant: SONY CORPORATION, Tokyo (JP)

(72) Inventor: Yoshiro Asano, Kanagawa (JP)

(73) Assignee: Sony Corporation, Tokyo (JP)

(*) Notice: Subject to any disclaimer, the term of this patent is extended or adjusted under 35 U.S.C. 154(b) by 394 days.

(21) Appl. No.: 16/334,476

(22) PCT Filed: Sep. 15, 2017

(86) PCT No.: PCT/JP2017/033505
§ 371 (c)(1),
(2) Date: Mar. 19, 2019

(87) PCT Pub. No.: WO2018/074125
PCT Pub. Date: Apr. 26, 2018

(65) Prior Publication Data
US 2021/0286165 A1    Sep. 16, 2021

(30) Foreign Application Priority Data

Oct. 19, 2016  (JP) .............. JP2016-205217
Mar. 31, 2017  (JP) .............. JP2017-070187

(51) Int. Cl.
G03B 21/16    (2006.01)
G02B 26/00    (2006.01)
G03B 21/20    (2006.01)

(52) U.S. Cl.
CPC ........... *G02B 26/008* (2013.01); *G03B 21/16* (2013.01); *G03B 21/204* (2013.01)

(58) Field of Classification Search
CPC ...... G03B 21/008; G03B 21/16; G03B 21/28; G03B 21/145; G03B 21/204;
(Continued)

(56) References Cited

U.S. PATENT DOCUMENTS

2004/0095767 A1    5/2004  Ohmae et al.
2009/0073591 A1    3/2009  Chou
(Continued)

FOREIGN PATENT DOCUMENTS

CN          1957605 A     5/2007
CN        101044427 A     9/2007
(Continued)

OTHER PUBLICATIONS

Office Action for CN Patent Application No. 201780062163.4 dated Dec. 15, 2020, 139 pages of Office Action and 12 pages of English Translation.
(Continued)

*Primary Examiner* — Sultan Chowdhury
(74) *Attorney, Agent, or Firm* — Chip Law Group

(57) ABSTRACT

A light source unit according to an embodiment of the present disclosure includes a light source section and a light-emitting device (1) that is excited by light derived from the light source unit and outputs fluorescence. The light-emitting device (1) includes a first base (11), a phosphor layer (12) provided on one face of the first base (11), and a first heat dissipation member (14) provided at the first base (11). The first heat dissipation member (14) includes a plurality of fins (14a and 14b) disposed to be spaced apart along a periphery.

19 Claims, 25 Drawing Sheets

(58) Field of Classification Search
CPC .............. G03B 21/208; G03B 21/2013; G03B 21/2033; G03B 21/2053; G02B 26/008; G02B 26/02; G02B 26/08; G02B 26/023; G02B 26/0816; G02B 26/106; H04N 9/3105; H04N 9/3109; H04N 9/3152; H04N 9/3161; H04N 9/3111; H04N 9/3164; F21V 29/38; F21V 29/54; F21V 29/67; F21V 29/70; F21V 29/74; F21V 29/76; F21V 29/502; F21V 29/503; F21V 29/745; F21V 29/767

See application file for complete search history.

(56) References Cited

U.S. PATENT DOCUMENTS

| | | | |
|---|---|---|---|
| 2014/0268063 A1* | 9/2014 | Akiyama | G03B 21/204 353/20 |
| 2014/0354960 A1* | 12/2014 | Miyazaki | G02B 26/008 353/84 |
| 2015/0226389 A1* | 8/2015 | Kasugai | G02B 5/3025 353/31 |
| 2015/0301437 A1* | 10/2015 | Tsuji | H05K 1/00 353/85 |
| 2016/0077326 A1 | 3/2016 | Yamagishi et al. | |
| 2016/0377967 A1 | 12/2016 | Ando et al. | |
| 2017/0175989 A1 | 6/2017 | Yamagishi et al. | |
| 2017/0205692 A1 | 7/2017 | Aoki | |
| 2017/0293211 A1 | 10/2017 | Kobayashi et al. | |
| 2018/0149953 A1* | 5/2018 | Nomoto | G03B 21/16 |
| 2018/0356715 A1* | 12/2018 | Kobayashi | G03B 21/16 |

FOREIGN PATENT DOCUMENTS

| | | |
|---|---|---|
| CN | 101393312 A | 3/2009 |
| CN | 201209573 Y | 3/2009 |
| CN | 201215171 Y | 4/2009 |
| CN | 102713486 A | 10/2012 |
| CN | 103052303 A | 4/2013 |
| CN | 103226283 A | 7/2013 |
| CN | 104216208 A | 12/2014 |
| CN | 105659161 A | 6/2016 |
| CN | 104516177 B | 8/2016 |
| CN | 106796387 A | 5/2017 |
| CN | 106990653 A | 7/2017 |
| JP | 09247877 | 9/1997 |
| JP | 2013-069547 A | 4/2013 |
| JP | 2013-143824 A | 7/2013 |
| JP | 2014-050173 A | 3/2014 |
| JP | 2014-199401 A | 10/2014 |
| JP | 2015-007751 A | 1/2015 |
| JP | 2015-143824 A | 8/2015 |
| JP | 2016-053608 A | 4/2016 |
| JP | 2016-066061 A | 4/2016 |
| JP | 2016-161709 A | 9/2016 |
| JP | 2017-116935 A | 6/2017 |
| JP | 2017-129842 A | 7/2017 |
| JP | 2017-151213 A | 8/2017 |
| KR | 100653068 B1 | 12/2006 |
| TW | 201531789 A | 8/2015 |
| WO | 2015/098602 A1 | 7/2015 |
| WO | 2016/056285 A1 | 4/2016 |
| WO | 2016/121028 A1 | 8/2016 |

OTHER PUBLICATIONS

International Search Report and Written Opinion of PCT Application No. PCT/JP2017/033505, dated Dec. 12, 2017, 11 pages of ISRWO.

Office Action for CN Patent Application No. 2017800621634, dated Jun. 22, 2021, 4 pages of Office Action and 3 pages of English Translation.

Office Action for JP Patent Application No. 2018-546197, dated May 18, 2021, 03 pages of English Translation and 03 pages of Office Action.

Office Action for CN Patent Application No. 2017800621634 dated Dec. 15, 2021, 06 pages of English Translation and 05 pages of Office Action.

* cited by examiner

[ FIG. 1 ]
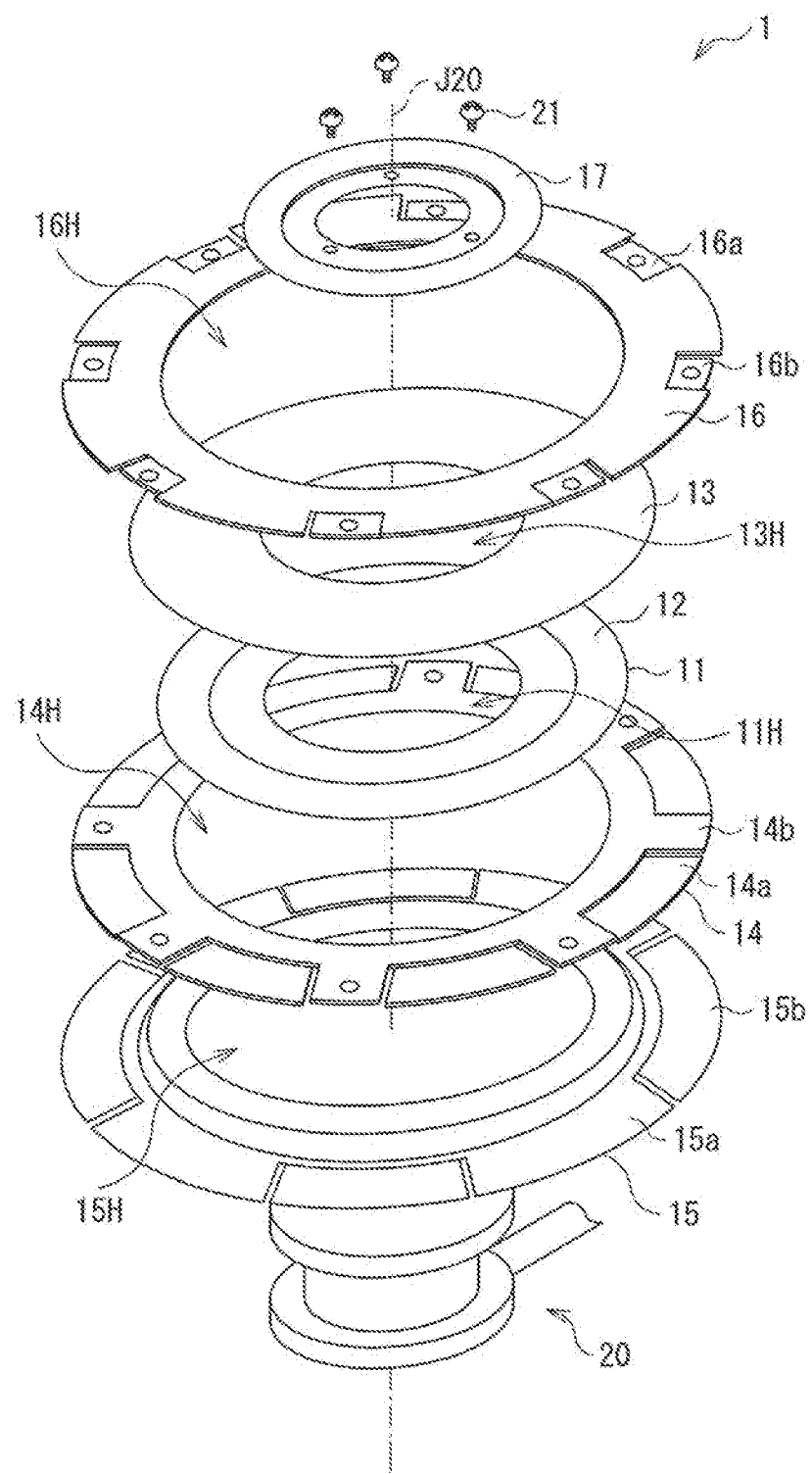

[FIG. 2]
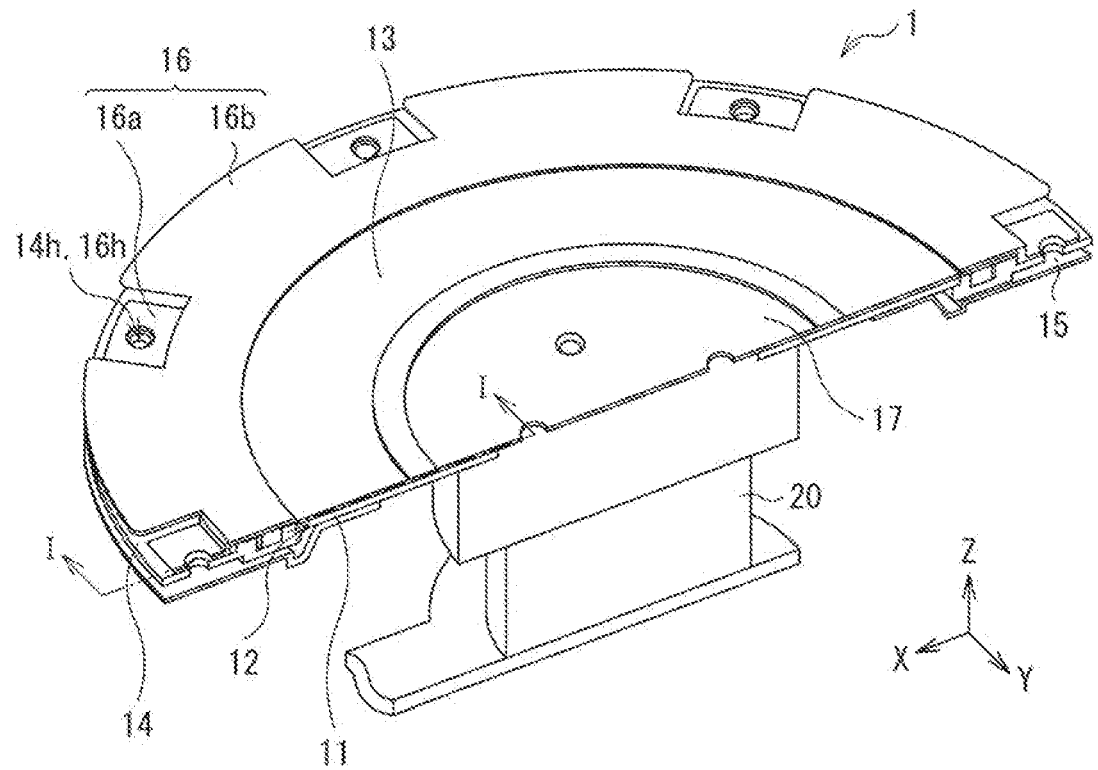
[FIG. 3]
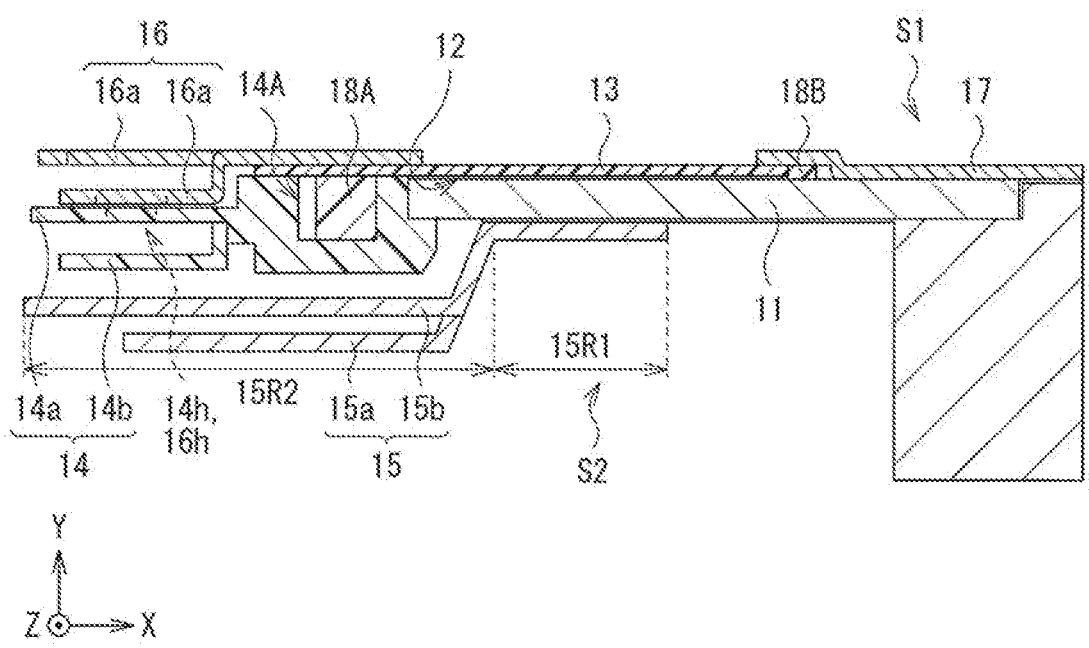

[FIG. 4]
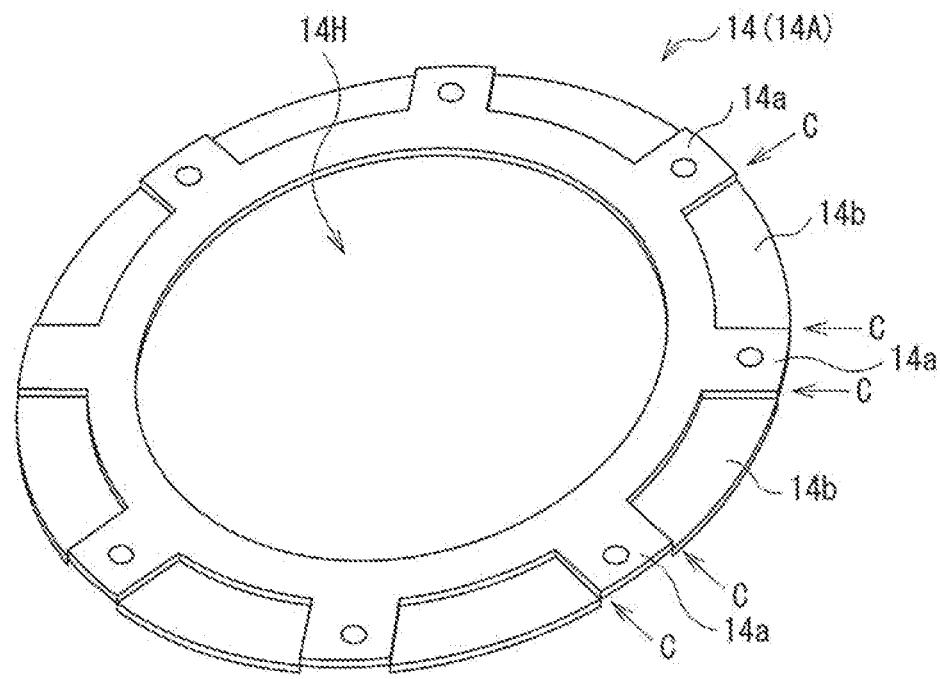
[FIG. 5]
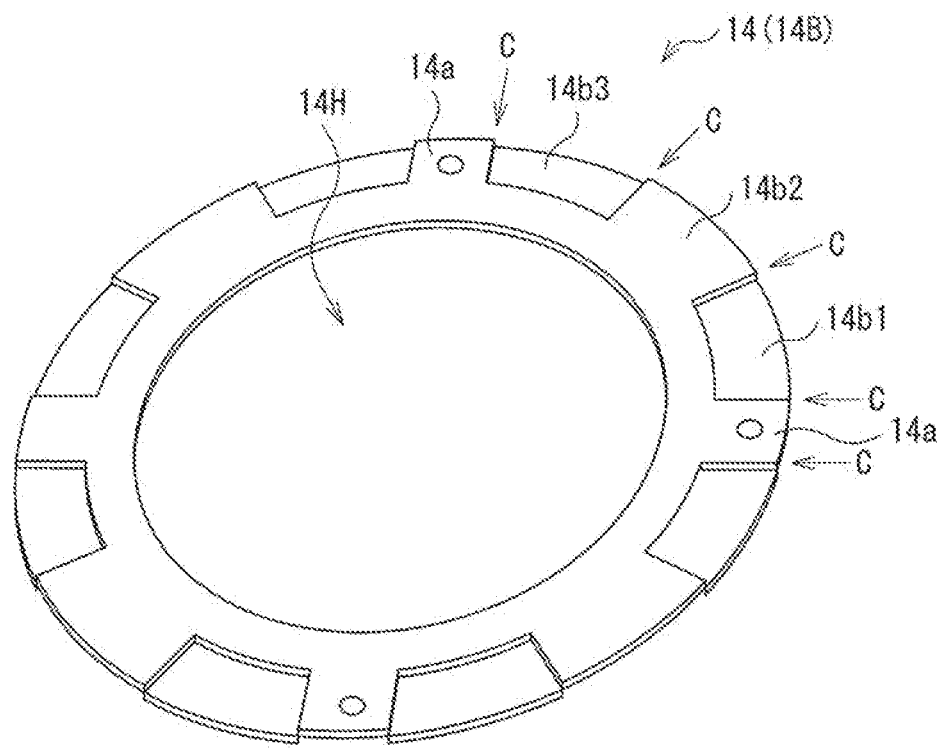

[ FIG. 6 ]
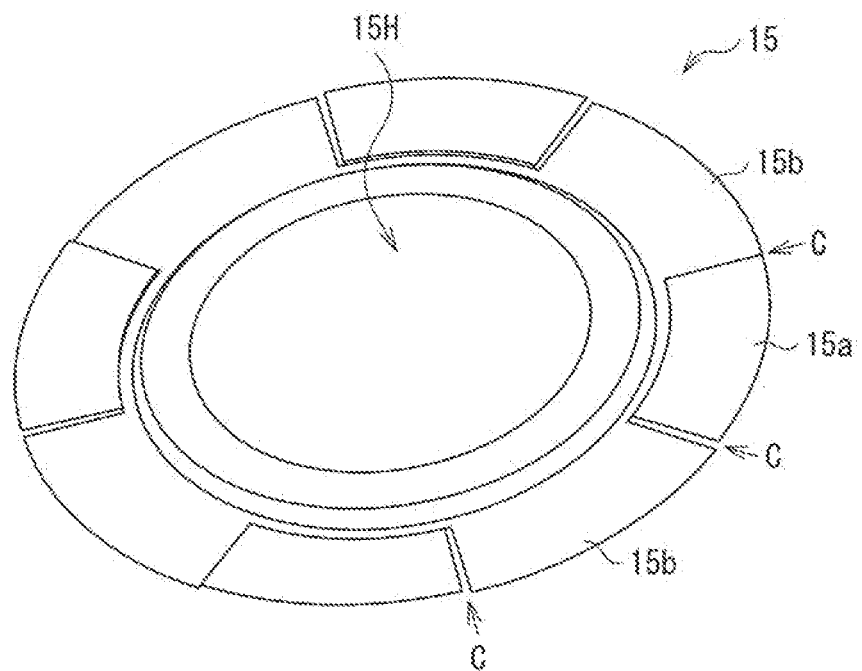
[ FIG. 7 ]
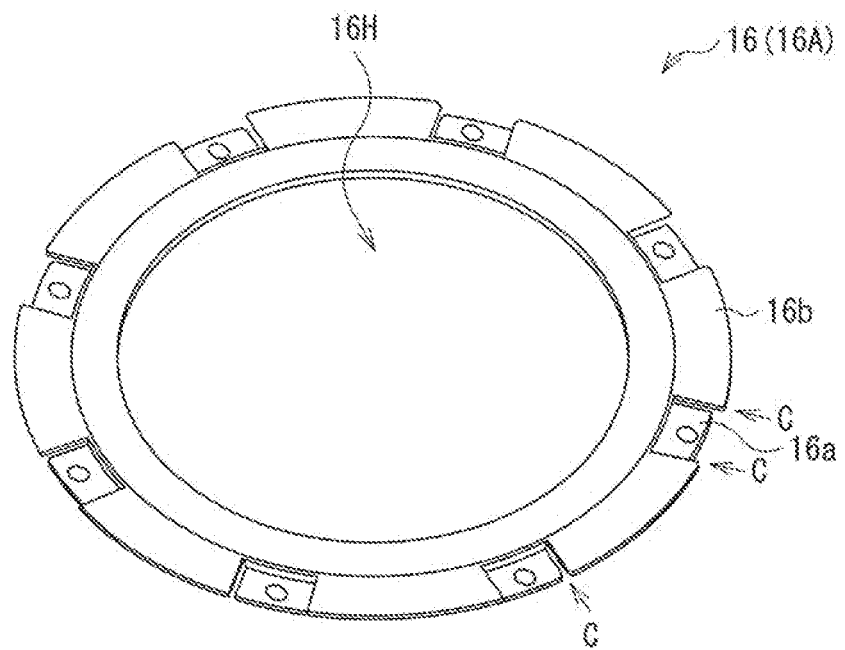

[FIG. 8]
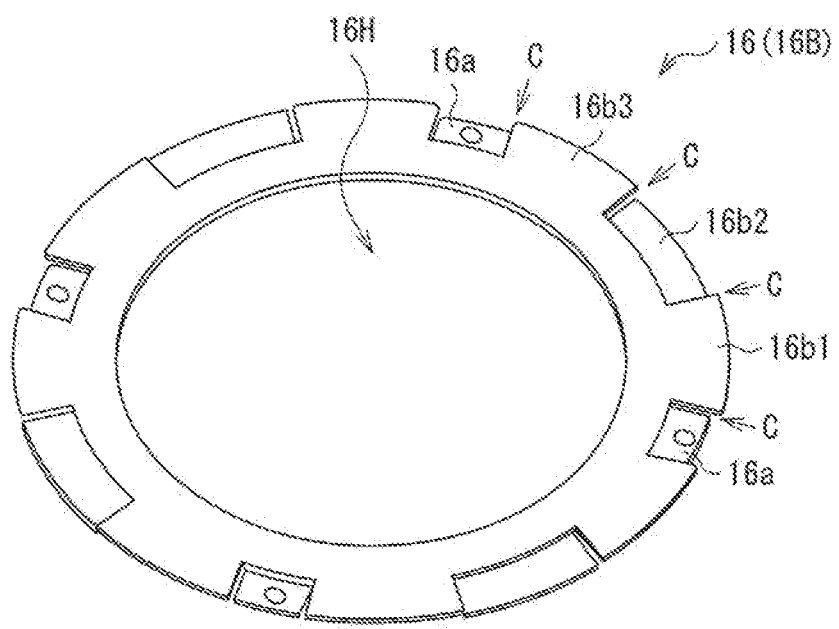

[FIG. 9]
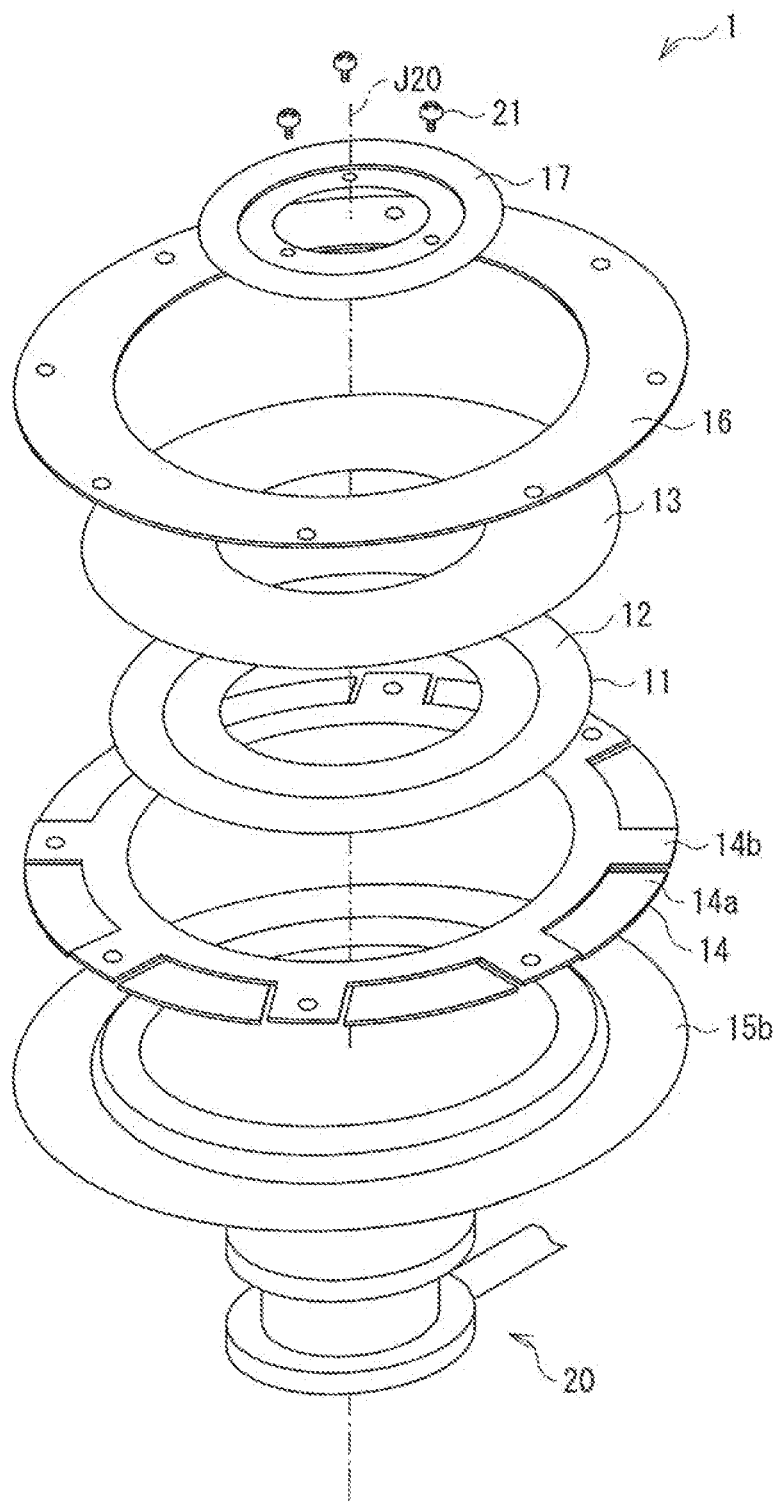

[FIG. 10]
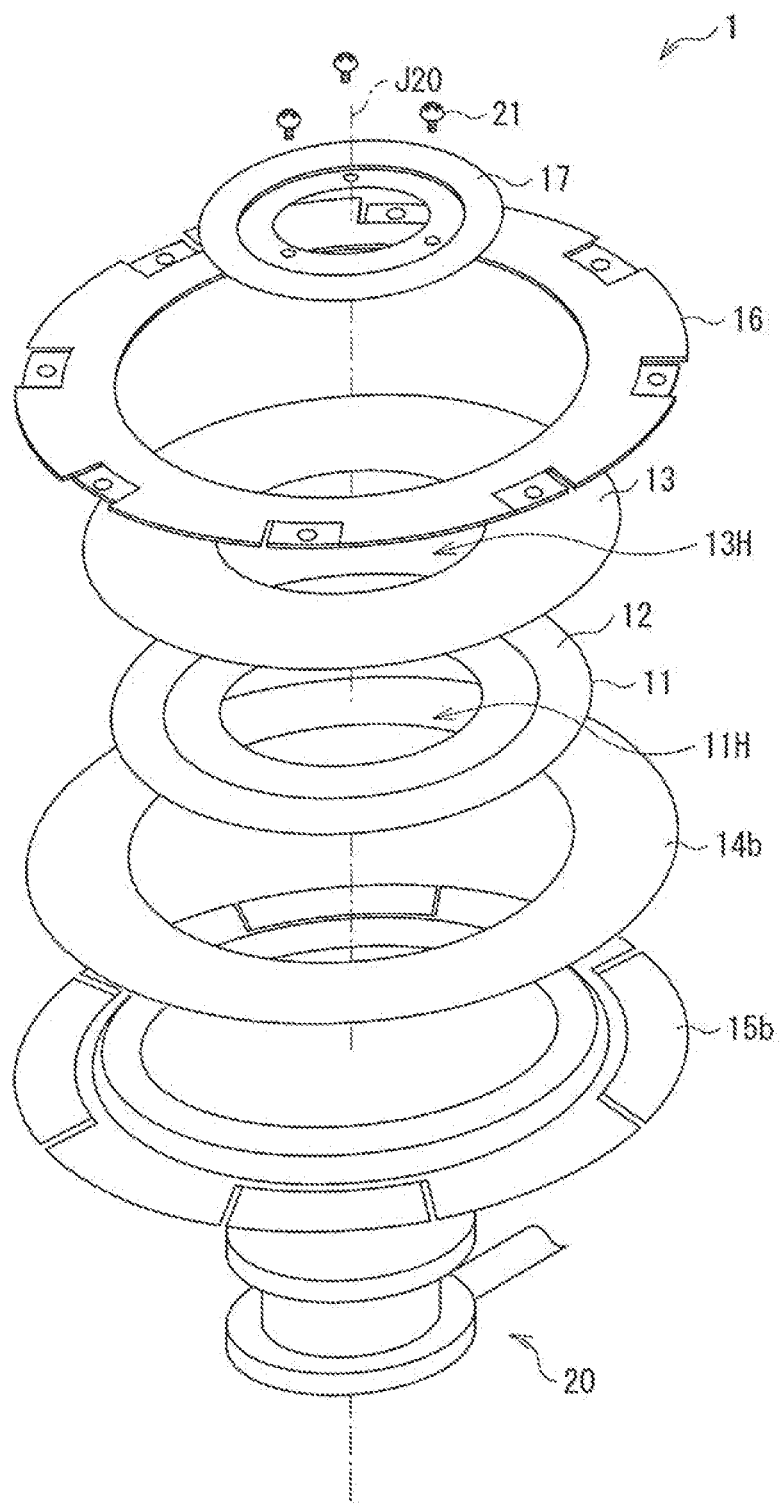

[FIG. 11]
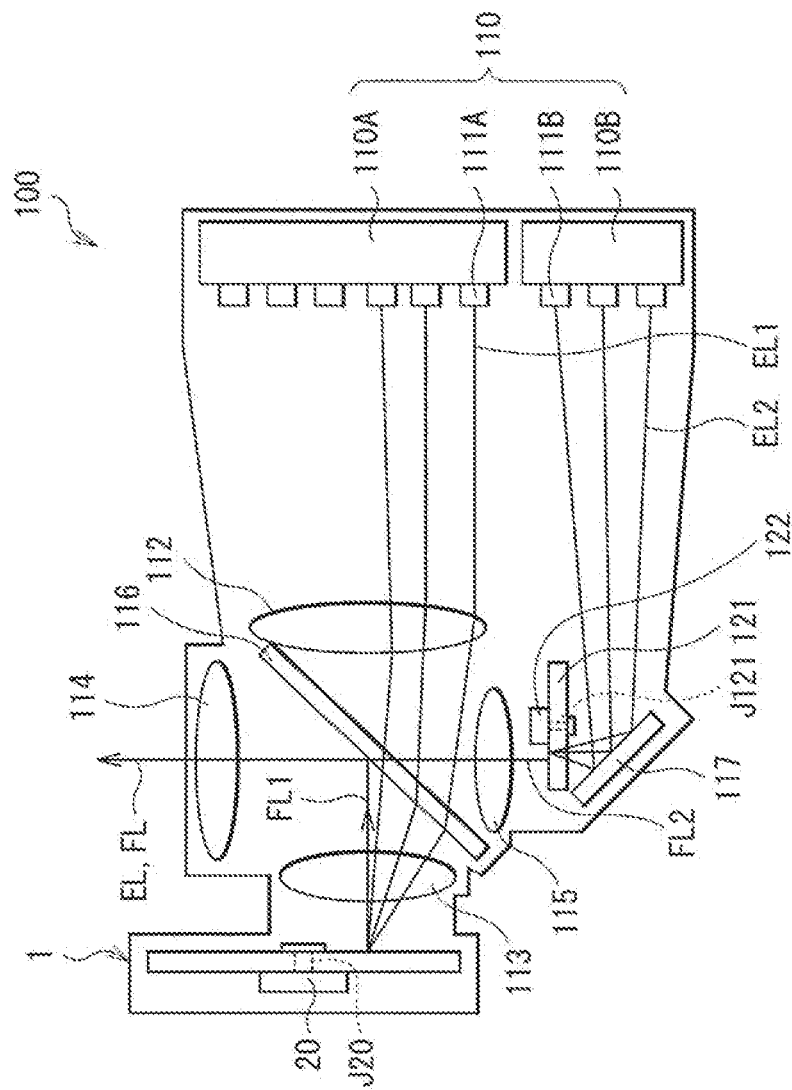

[ FIG. 12 ]
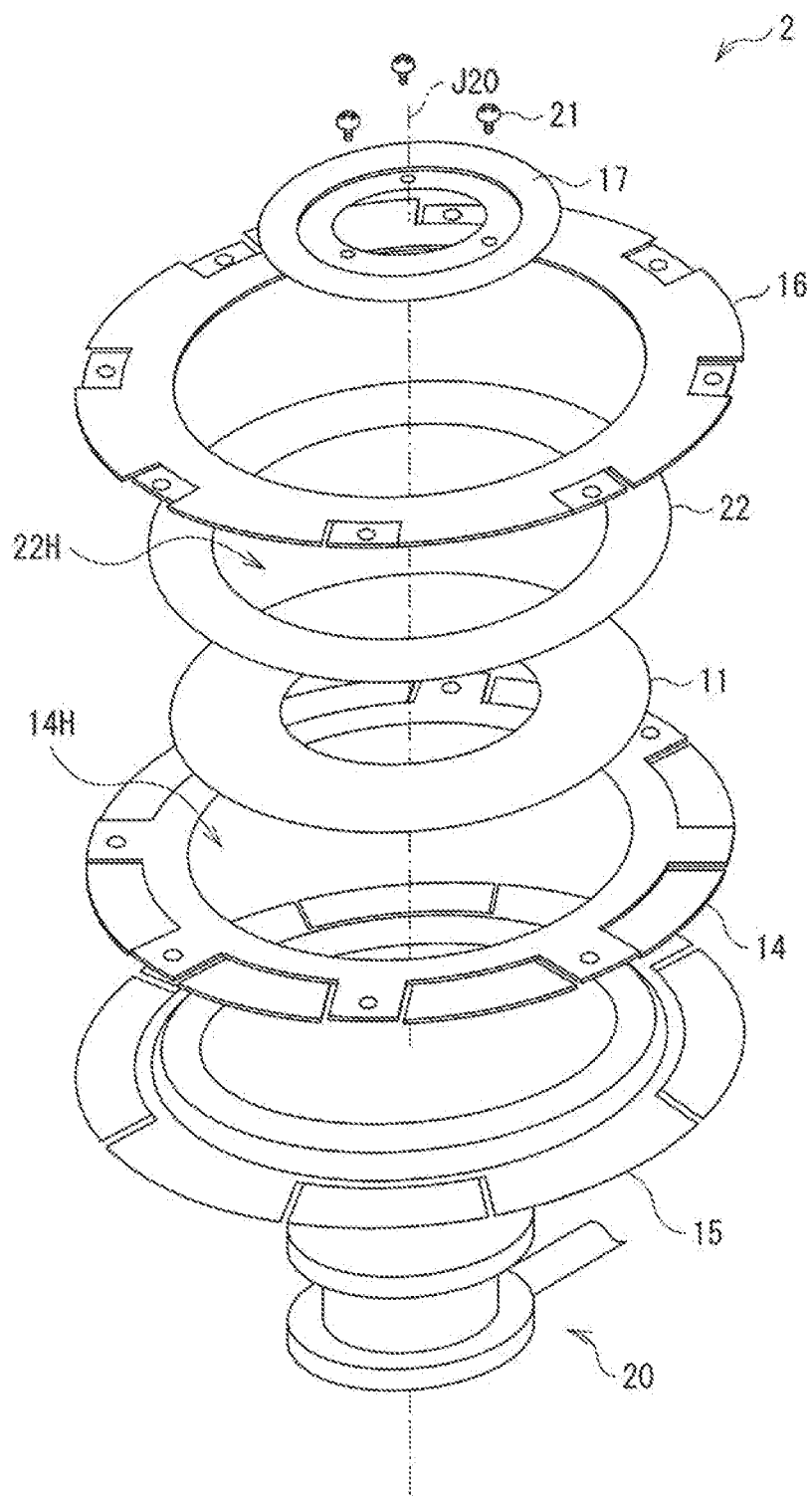

[ FIG. 13 ]
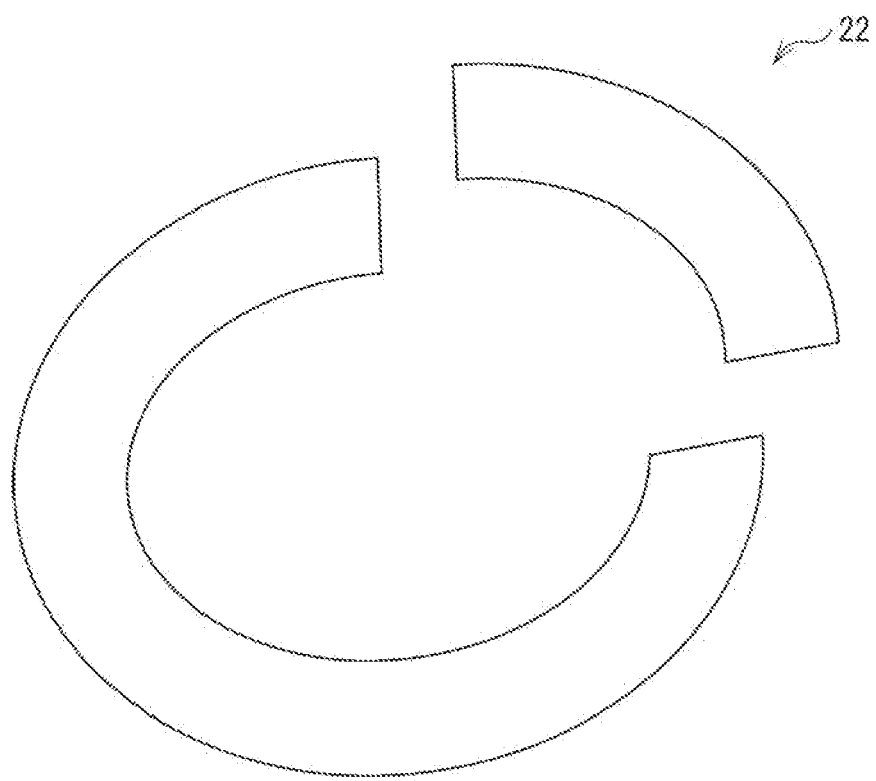

[ FIG. 14 ]
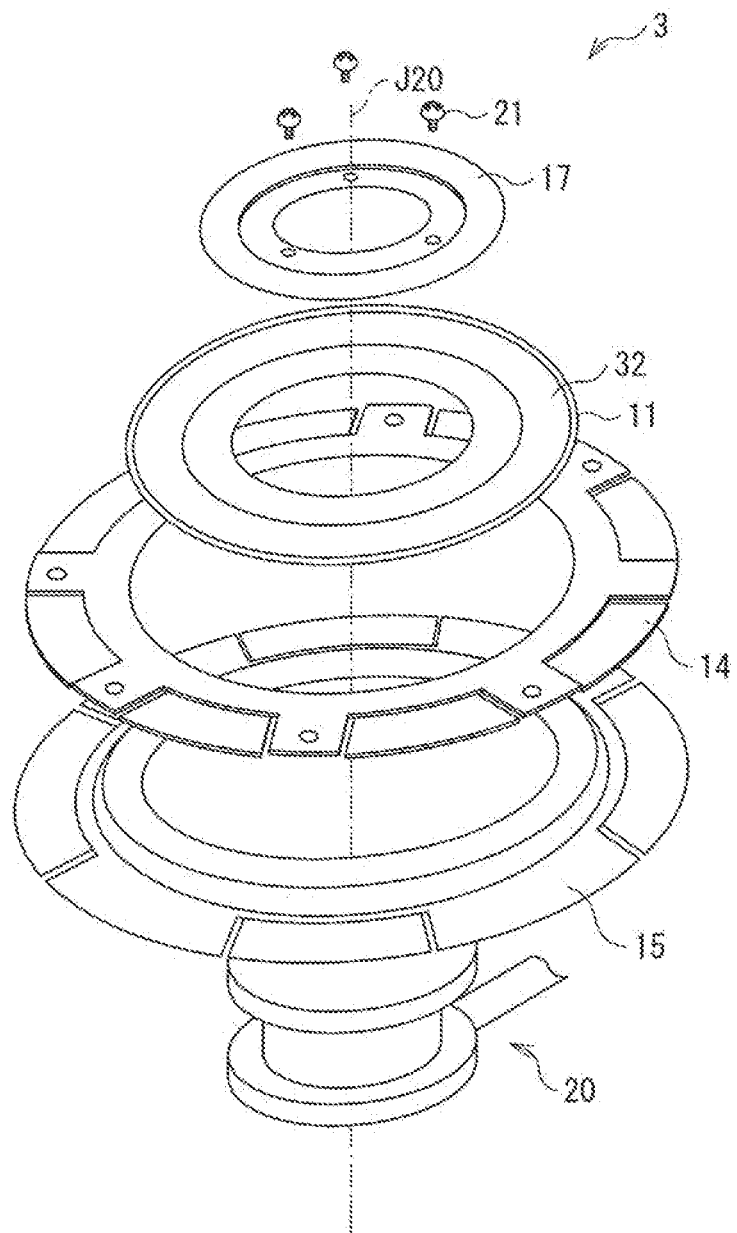

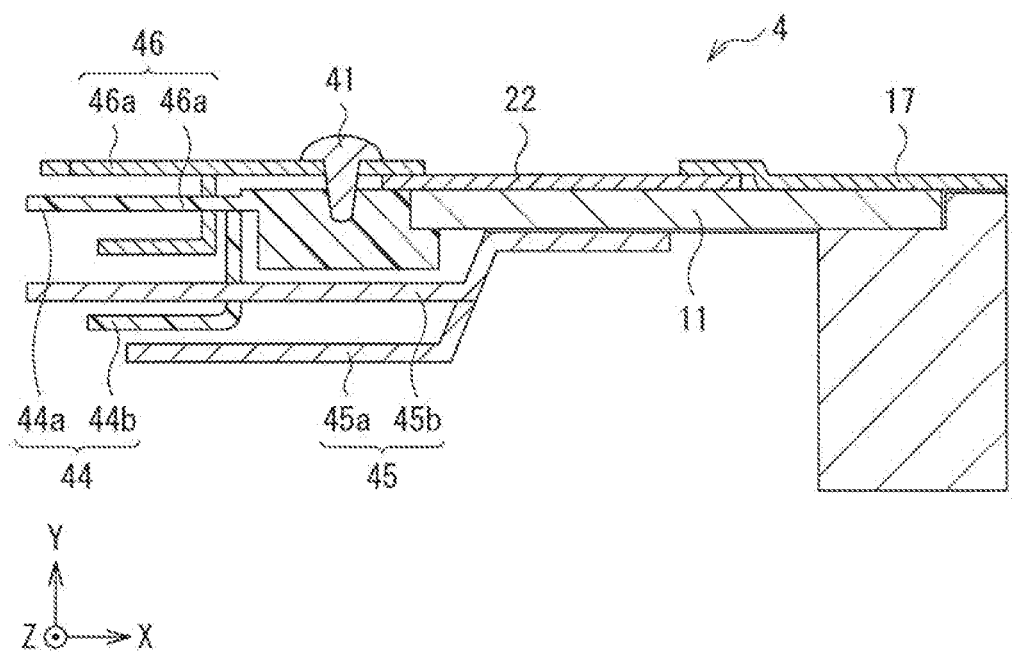
[FIG. 15A]

[FIG. 15B]
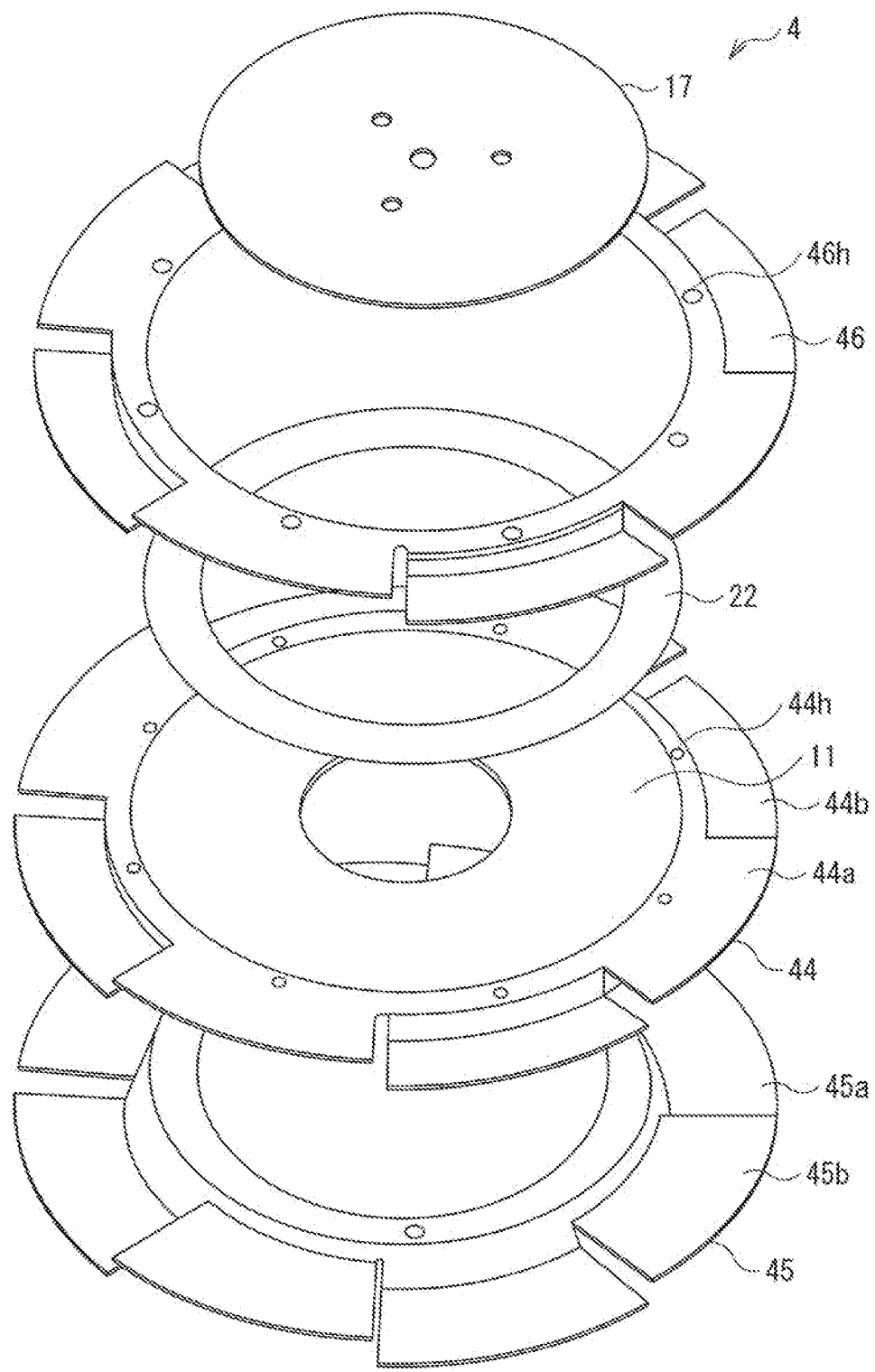

[ FIG. 16 ]
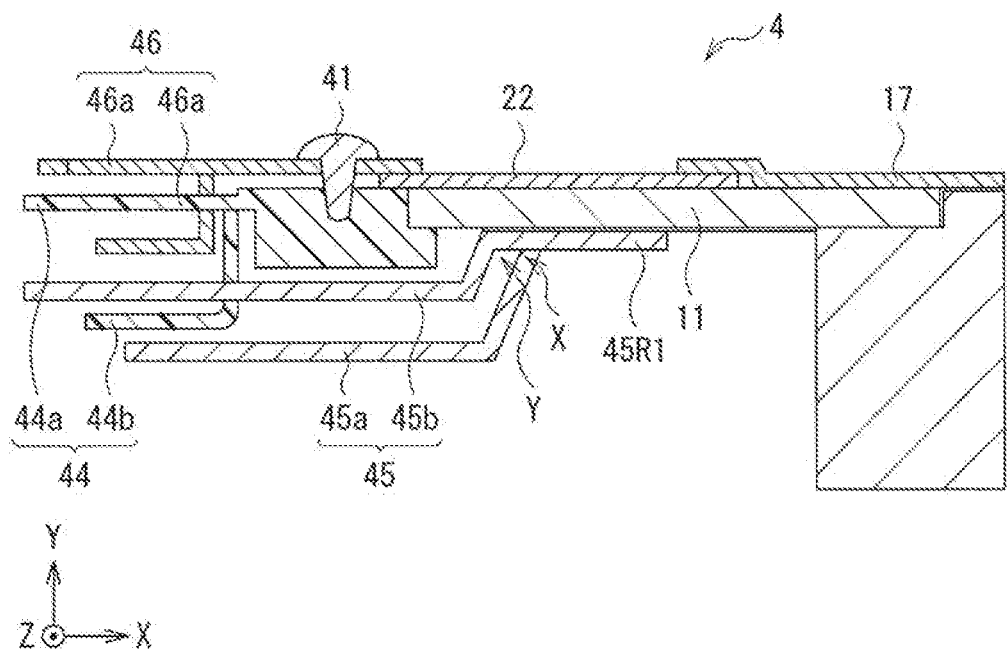

[FIG. 17A]
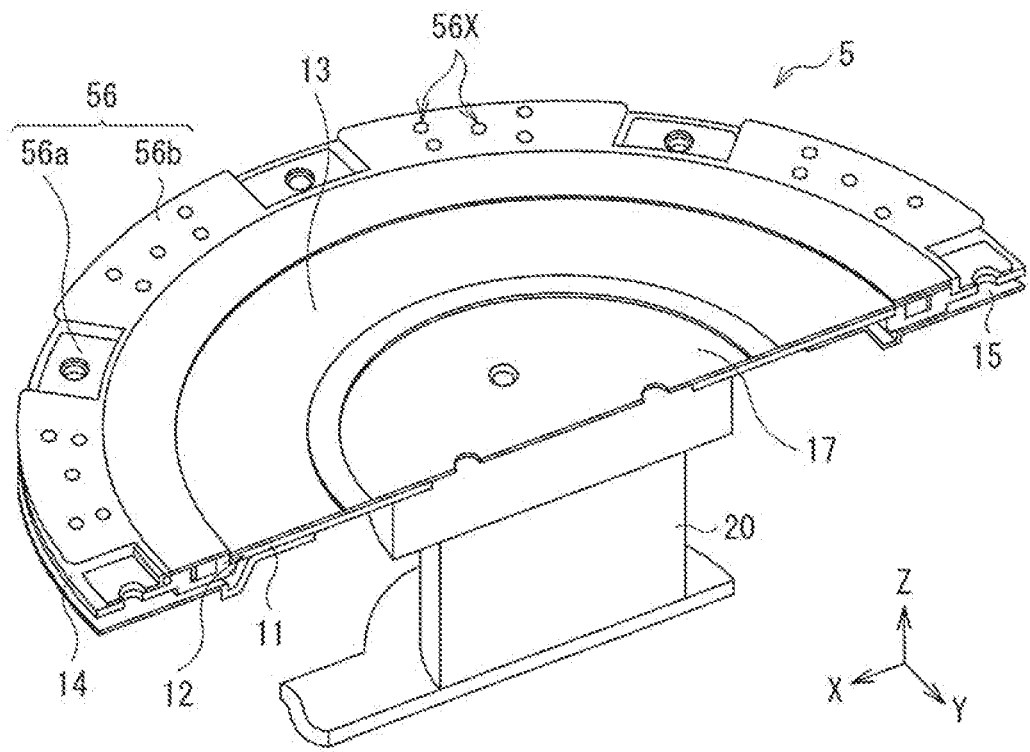
[FIG. 17B]
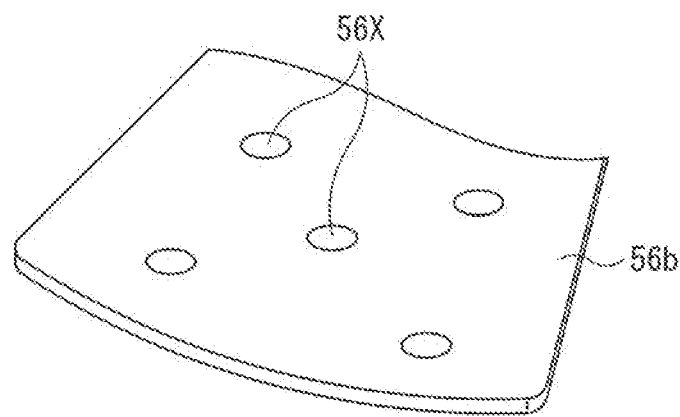

[FIG. 18]
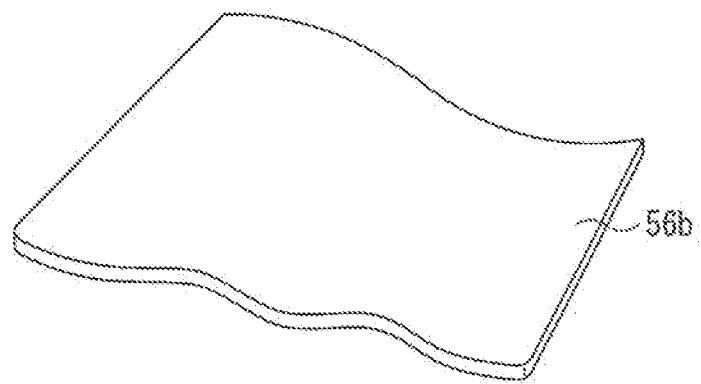
[FIG. 19]
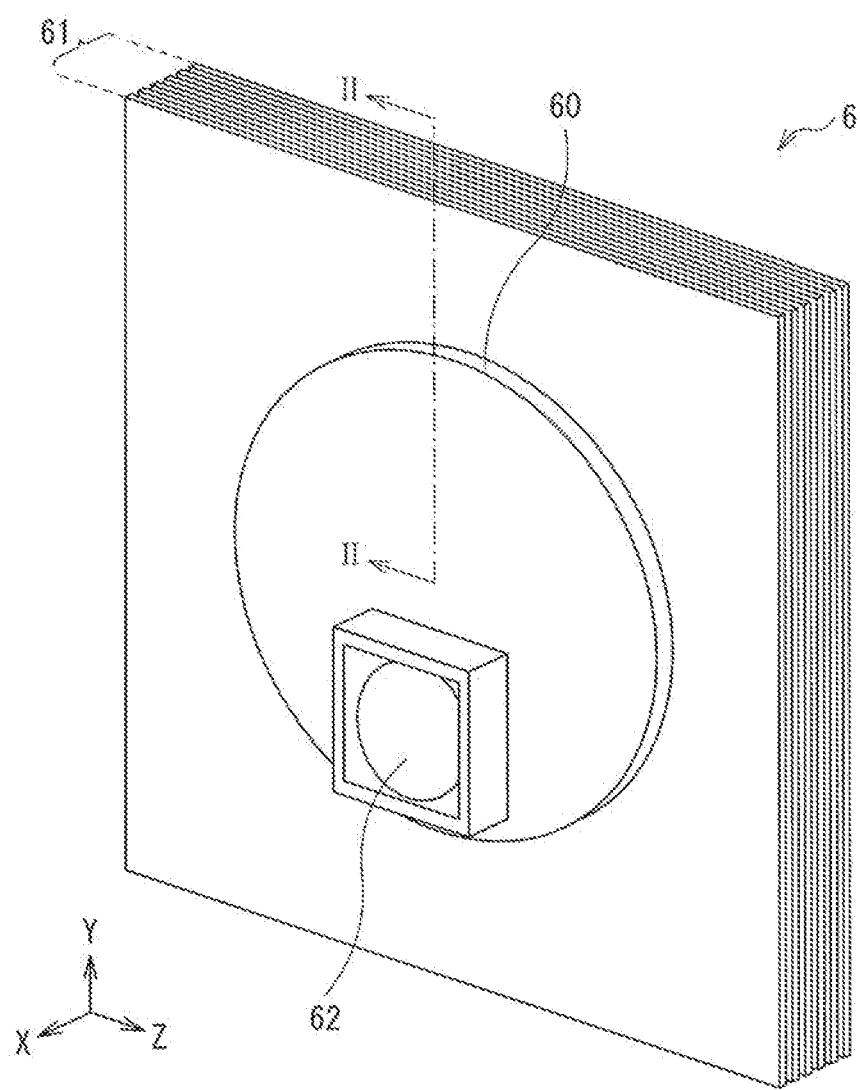

[FIG. 20]
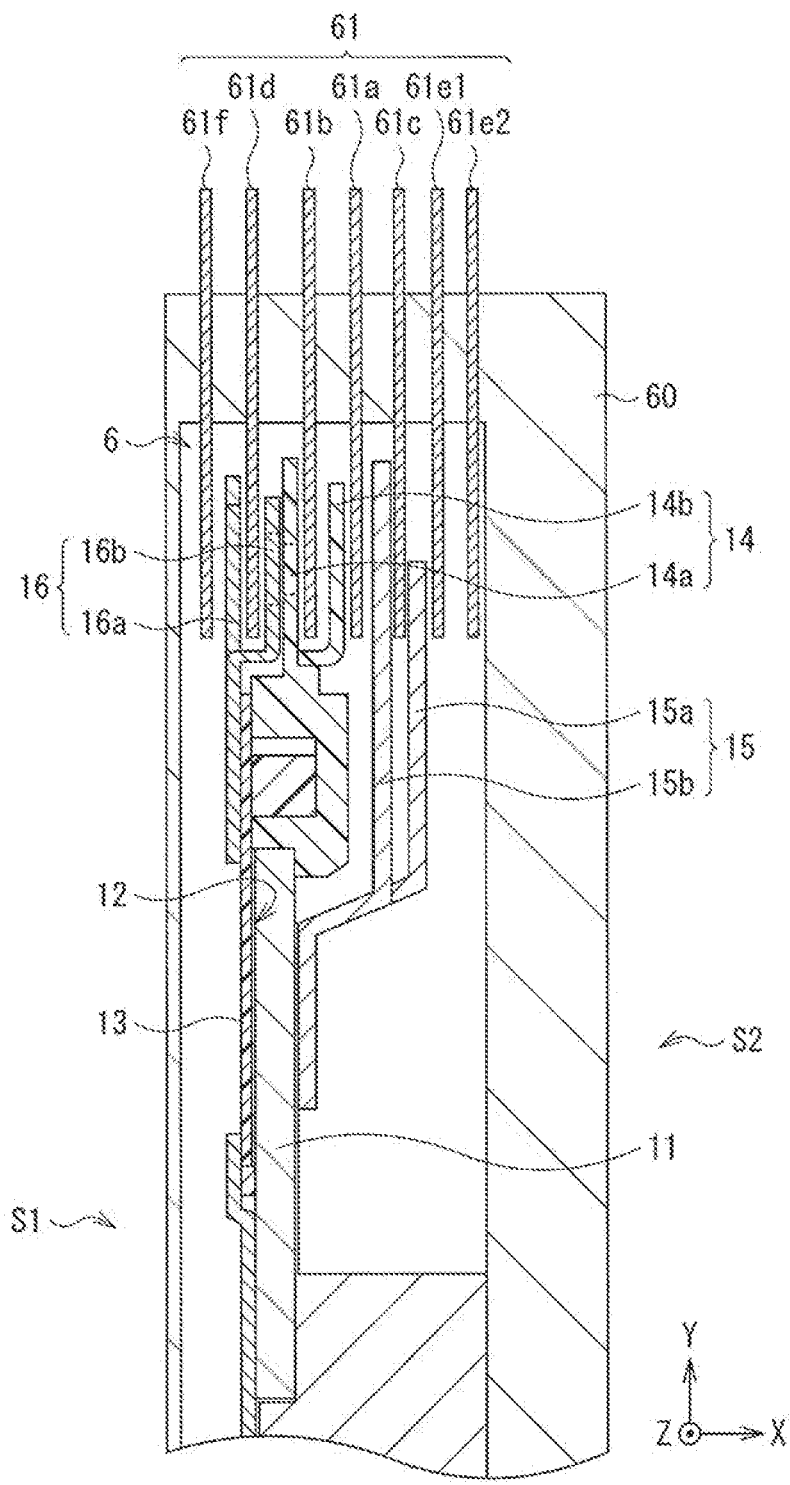

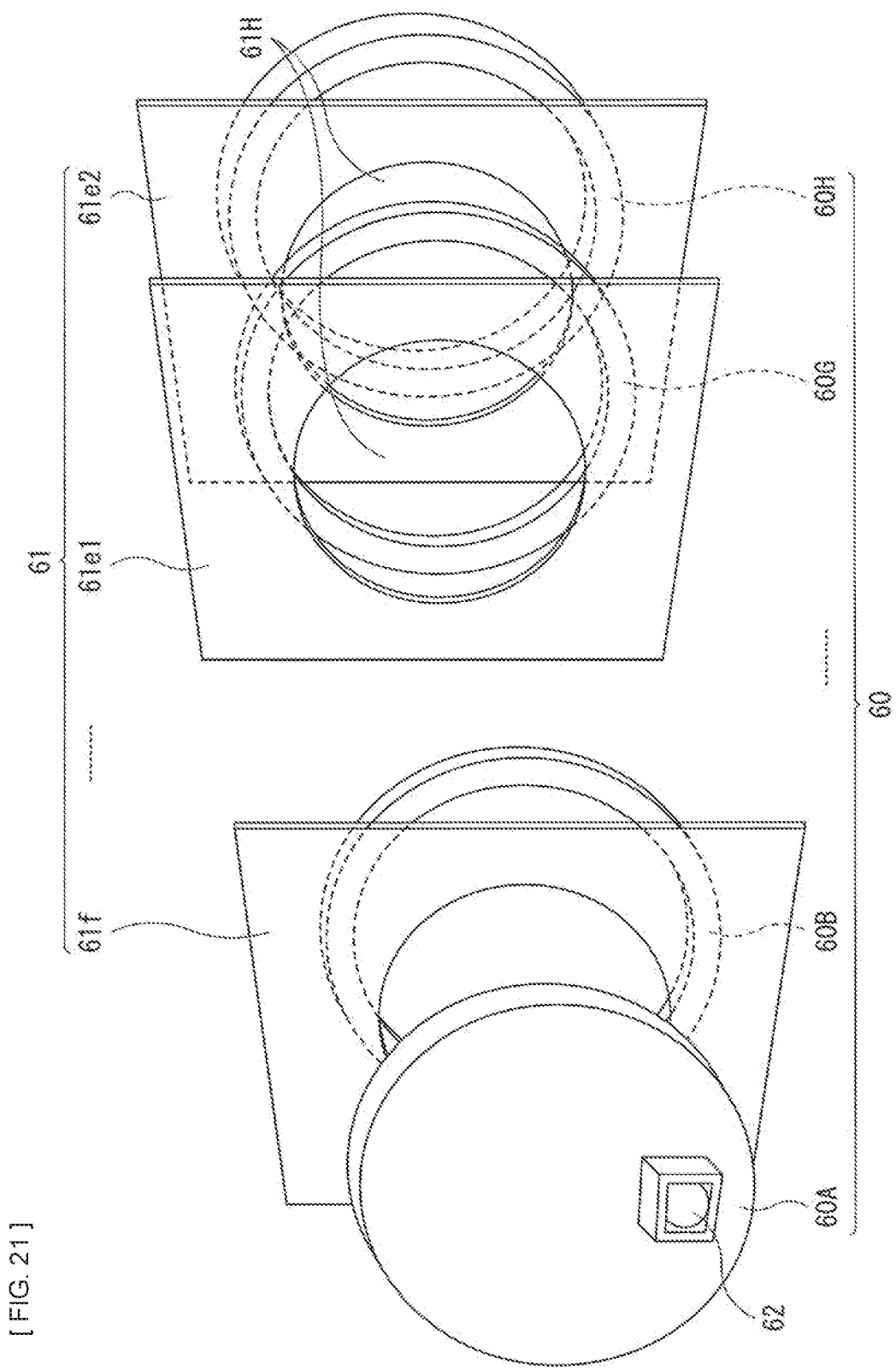
[FIG. 21]

[FIG. 22]
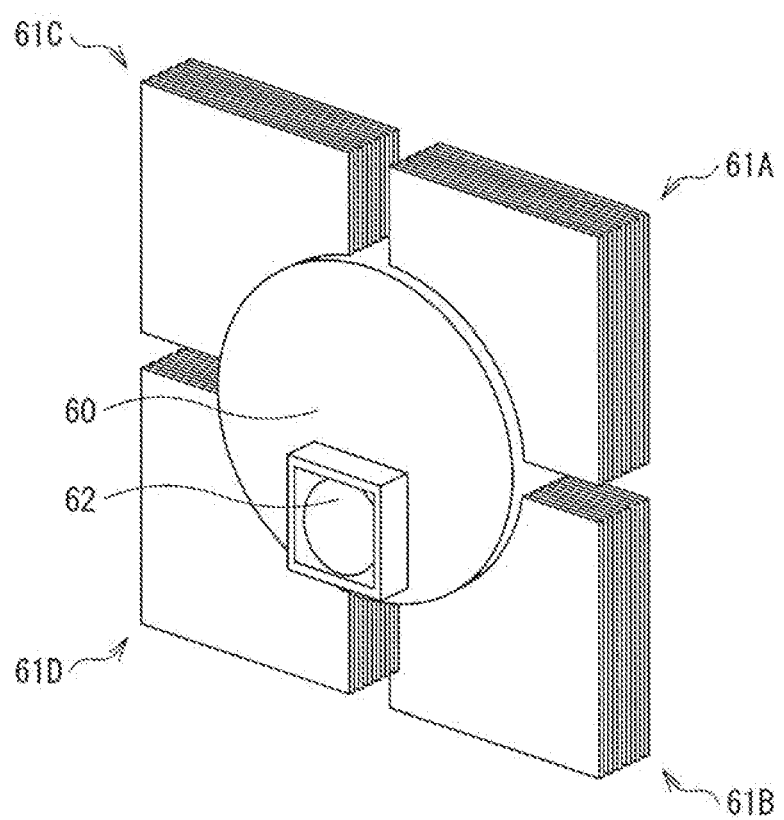

[FIG. 23]
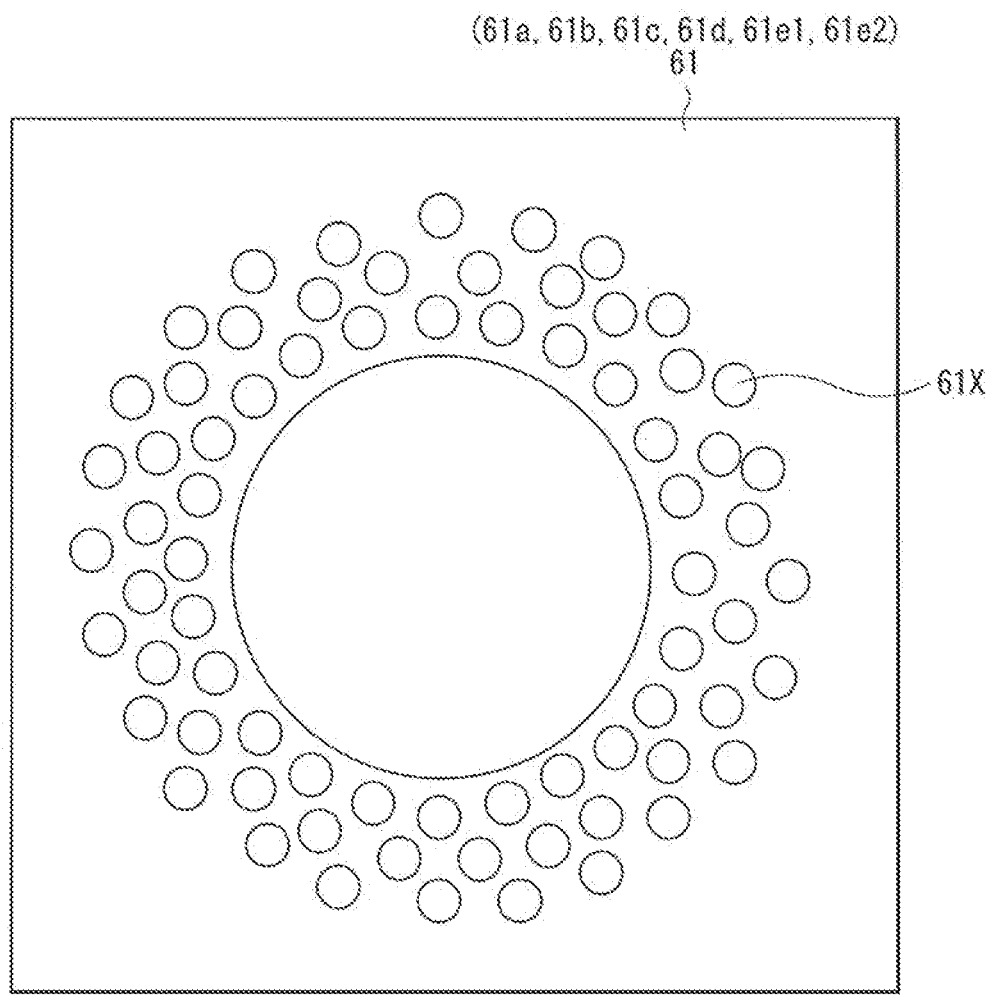

[FIG. 24]
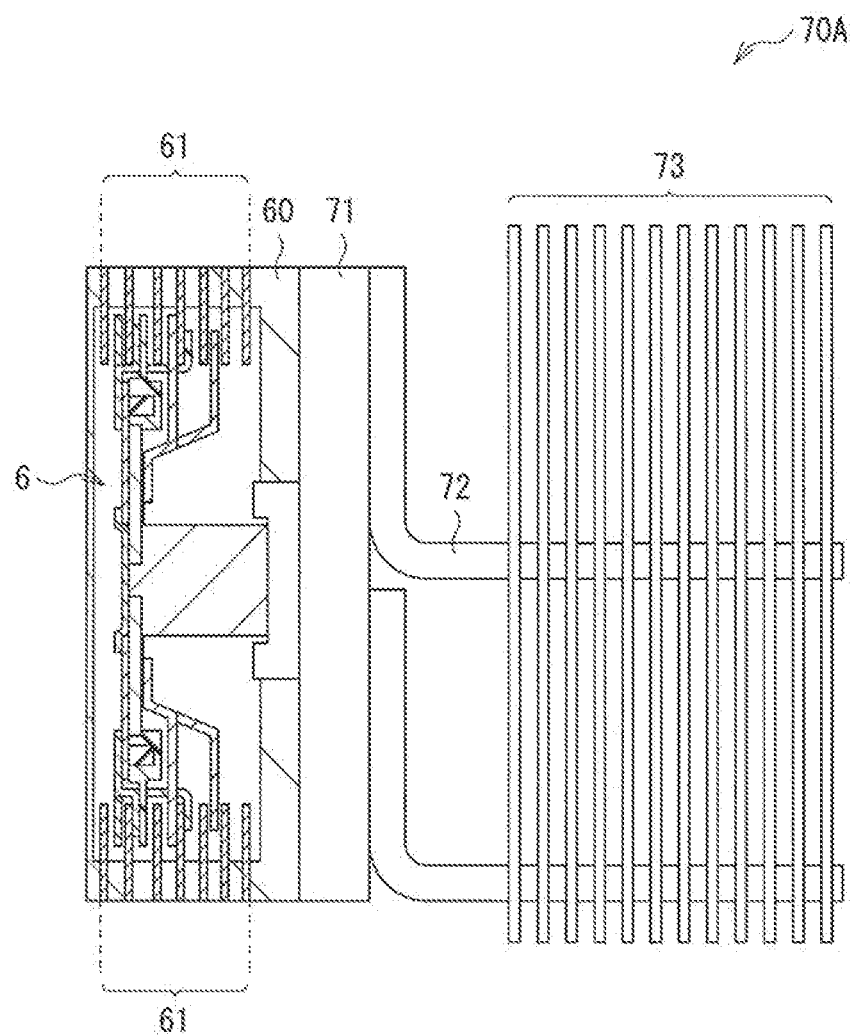

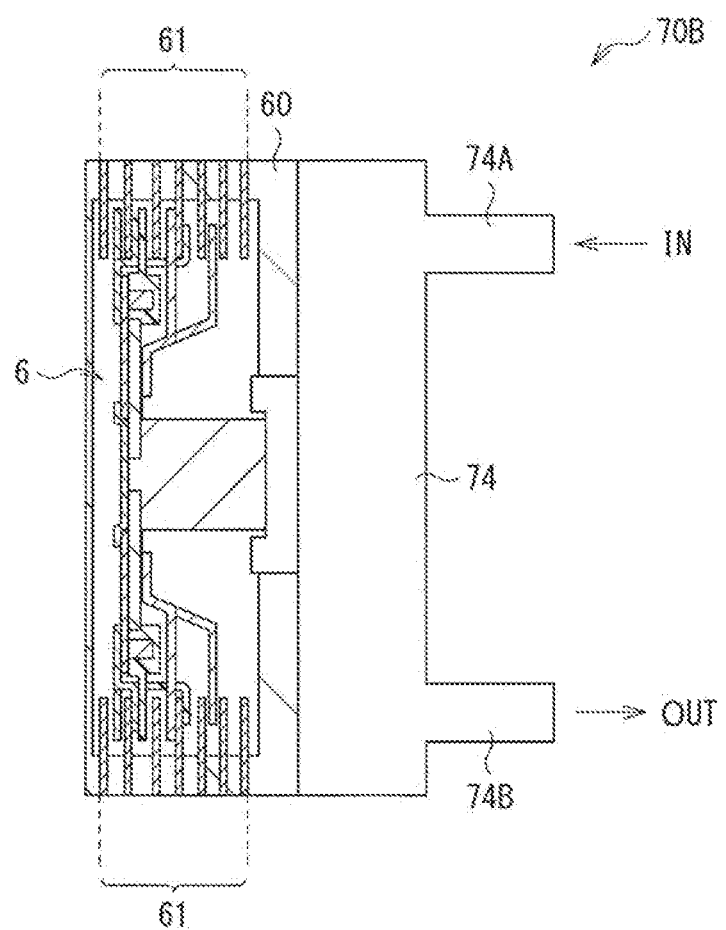
[FIG. 25]

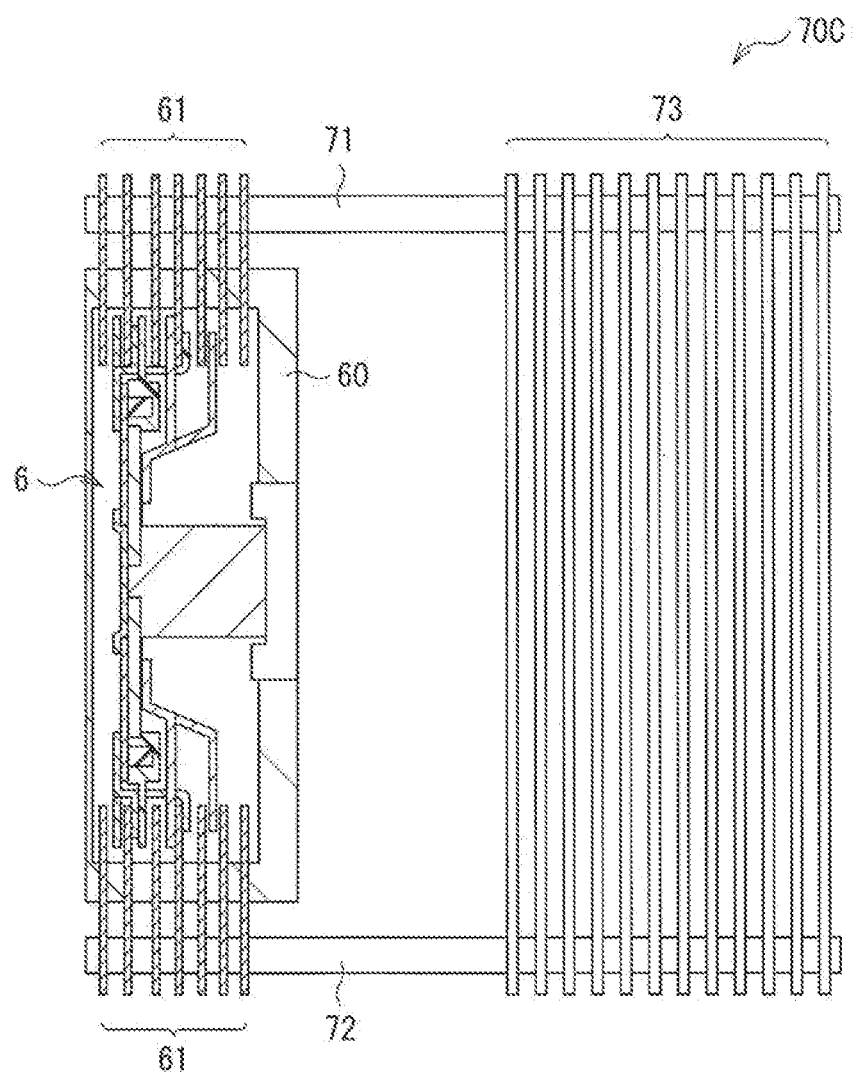
[FIG. 26]

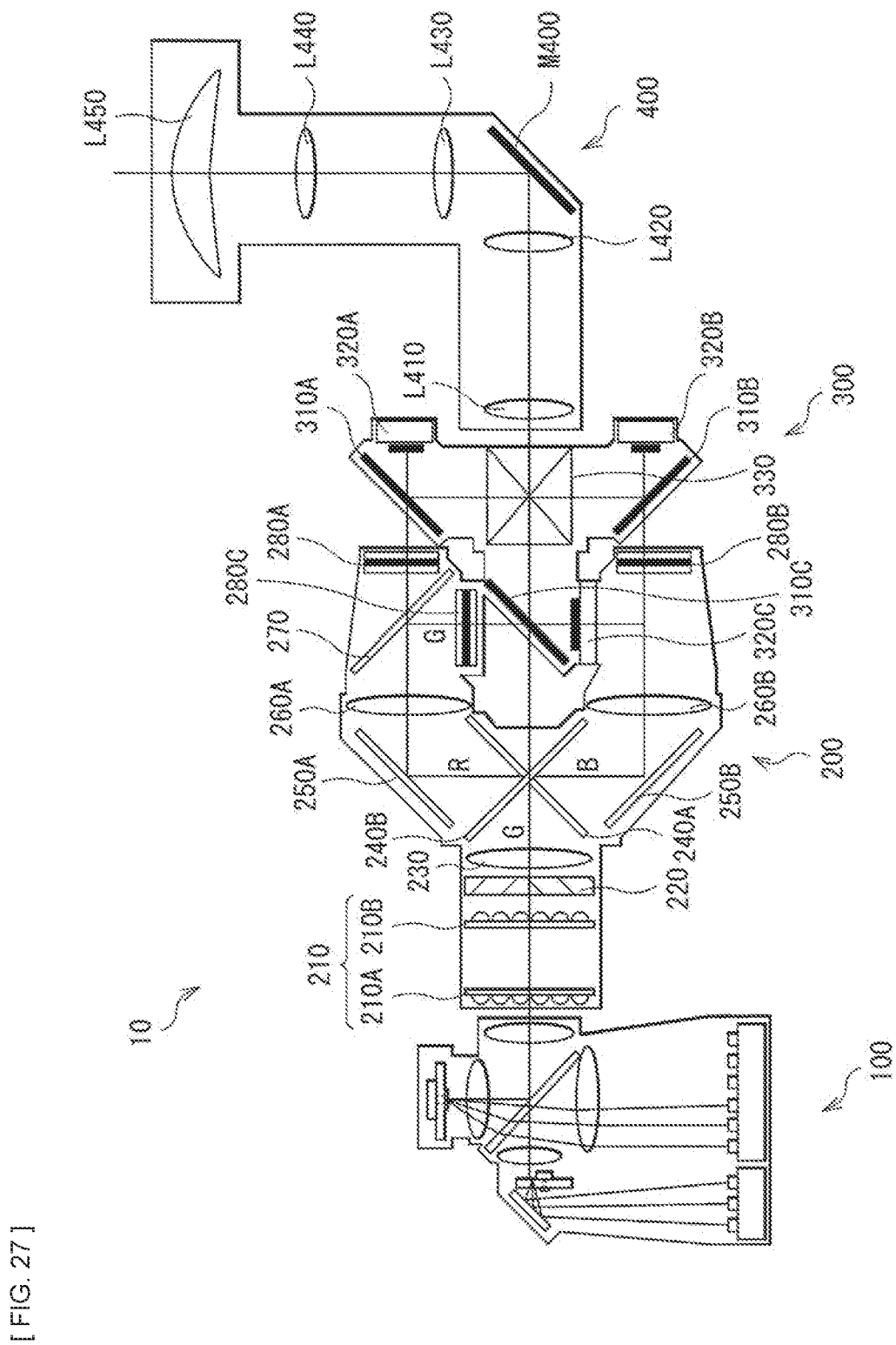
[FIG. 27]

[ FIG. 28 ]
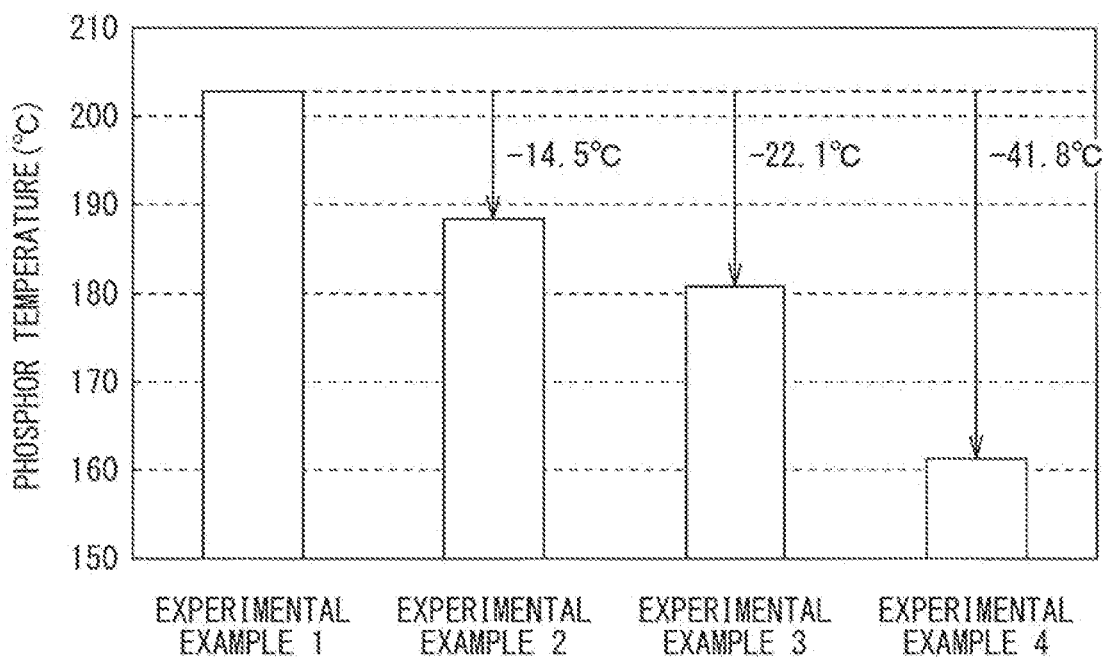
[ FIG. 29 ]
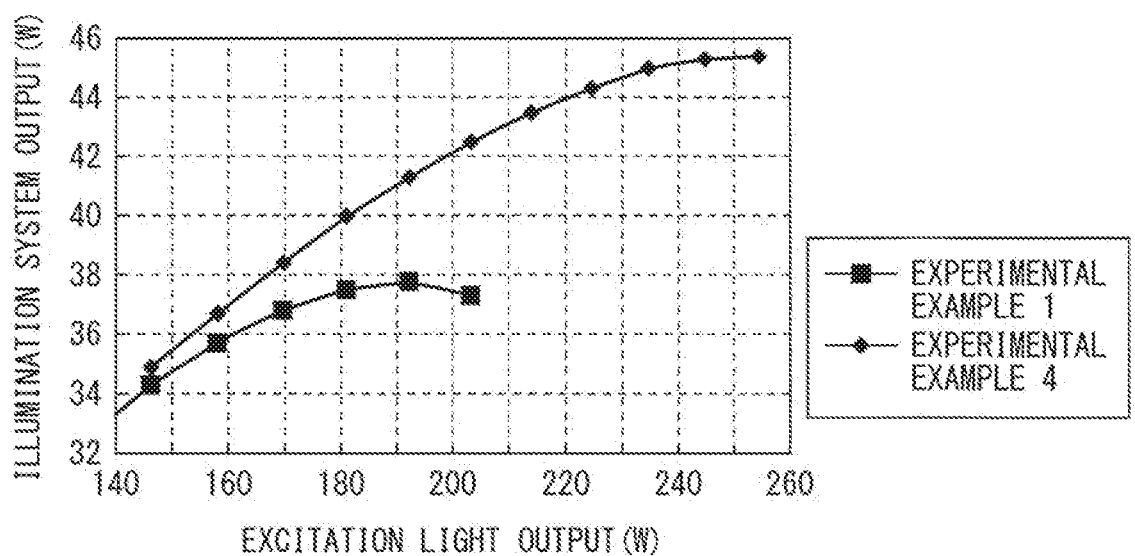

LIGHT SOURCE UNIT AND PROJECTION DISPLAY APPARATUS

CROSS REFERENCE TO RELATED APPLICATIONS

This application is a U.S. National Phase of International Patent Application No. PCT/JP2017/033505 filed on Sep. 15, 2017, which claims priority benefit of Japanese Patent Application No. JP 2016-205217 filed in the Japan Patent Office on Oct. 19, 2016 and also claims priority benefit of Japanese Patent Application No. JP 2017-070187 filed in the Japan Patent Office on Mar. 31, 2017. Each of the above-referenced applications is hereby incorporated herein by reference in its entirety.

TECHNICAL FIELD

The present disclosure relates to a light source unit provided with a phosphor wheel, and a projection display apparatus.

BACKGROUND ART

In recent years, projectors have been made smaller. As a light source optical system for the projectors, a light emission device (light source unit) using a semiconductor laser (laser diode; LD) and a phosphor has been developed. In the light emission device, the LD is used as a light source, and light outputted from the LD excites the phosphor to cause yellow light or white light to be extracted, for example. The phosphor, which is bonded by a cross-linking body of an inorganic material, is fixed on a substrate as a phosphor layer, as with a projector fluorescent wheel (phosphor wheel) described in PTL1, for example. In PTL1, water glass is used as the cross-linking body (binder) of the inorganic material. In addition to this, as a phosphor wheel without a binder, a phosphor wheel using a ceramic phosphor and a so-called binderless phosphor wheel have been developed.

CITATION LIST

Patent Literature

PTL 1: Japanese Unexamined Patent Application Publication No. 2015-143824

SUMMARY OF THE INVENTION

Incidentally, in a light source unit using a phosphor, there is a possibility that luminance may be reduced due to temperature quenching of the phosphor caused by a temperature rise.

It is desirable to provide a light source unit and a projection display apparatus that make it possible to improve luminance.

A light source unit according to an embodiment of the present disclosure includes a light source section and a light-emitting device that is excited by light derived from the light source unit and outputs fluorescence. The light-emitting device includes a first base, a phosphor layer provided on one face of the first base, and a first heat dissipation member provided at the first base. The first heat dissipation member includes a plurality of fins disposed to be spaced apart along a periphery.

A projection display apparatus according to an embodiment of the present disclosure includes a light source optical system, an image generation optical system that generates image light by modulating, on the basis of an inputted image signal, light derived from the light source optical system, and a projection optical system that projects the image light generated by the image generation optical system. The light source optical system included in the projection display apparatus have the same components as those of the light source unit according to an embodiment of the above-described present disclosure.

In the light source unit according to an embodiment and the projection display apparatus according to an embodiment of the present disclosure, the first heat dissipation member including the plurality of fins that are disposed to be spaced apart along the periphery is provided at the first base provided with the phosphor layer. This makes it possible to improve cooling efficiency of the phosphor layer.

According to the light source unit according to an embodiment and the projection display apparatus according to an embodiment of the present disclosure, the first heat dissipation member including the plurality of fins that are disposed to be spaced apart along the periphery is provided at the first base provided with the phosphor layer. This improves cooling efficiency of the phosphor layer. Accordingly, conversion efficiency of fluorescence in the phosphor layer improves, making it possible to improve illuminance.

It is to be noted that the effects described here are not necessarily limitative, and may be any other effects described in the present disclosure.

BRIEF DESCRIPTION OF DRAWINGS

FIG. 1 is an exploded perspective view of a configuration example of a phosphor wheel according to a first embodiment of the present disclosure.

FIG. 2 is a perspective view of the configuration of the phosphor wheel illustrated in FIG. 1.

FIG. 3 is a cross-sectional view of the configuration of the phosphor wheel illustrated in FIG. 1.

FIG. 4 is a perspective view of a configuration example of an outer spacer of the present disclosure.

FIG. 5 is a perspective view of another configuration example of the outer spacer of the present disclosure.

FIG. 6 is a perspective view of a configuration of a wheel heat sink of the present disclosure.

FIG. 7 is a perspective view of a configuration example of a glass holder heat sink of the present disclosure.

FIG. 8 is a perspective view of another configuration example of the glass holder heat sink of the present disclosure.

FIG. 9 is an exploded perspective view of another configuration example of the phosphor wheel according to the first embodiment of the present disclosure.

FIG. 10 is an exploded perspective view of another configuration example of the phosphor wheel according to the first embodiment of the present disclosure.

FIG. 11 is a schematic diagram illustrating a configuration example of a light source unit including the phosphor wheel illustrated in FIG. 1, etc.

FIG. 12 is an exploded perspective view of a configuration of a phosphor wheel according to a second embodiment of the present disclosure.

FIG. 13 describes a method of manufacturing a phosphor layer illustrated in FIG. 12.

FIG. 14 is an exploded perspective view of a configuration of a phosphor wheel according to a third embodiment of the present disclosure.

FIG. 15A is a cross-sectional view of a configuration example of a phosphor wheel according to a modification example 1 of the present disclosure.

FIG. 15B is an exploded perspective view of the phosphor wheel illustrated in FIG. 15A.

FIG. 16 is a cross-sectional view of another configuration example of the phosphor wheel according to the modification example 1 of the present disclosure.

FIG. 17A is a perspective view of a configuration example of a phosphor wheel according to a modification example 2 of the present disclosure.

FIG. 17B is an enlarged schematic view of a fin part of a glass holder heat sink illustrated in FIG. 17A.

FIG. 18 is a perspective view of another configuration example of a phosphor wheel according to a modification example of the present disclosure.

FIG. 19 is a perspective view of an appearance of a phosphor wheel according to a fourth embodiment of the present disclosure.

FIG. 20 is a cross-sectional view of a configuration of the phosphor wheel illustrated in FIG. 19.

FIG. 21 is an explanatory exploded perspective view of the configuration of the phosphor wheel illustrated in FIG. 19.

FIG. 22 is a perspective view of another configuration example of the phosphor wheel according to the fourth embodiment of the present disclosure.

FIG. 23 is a plan view of a configuration example of a heat exchange fin illustrated in FIG. 19.

FIG. 24 is a cross-sectional schematic view of an example of a cooling structure of the phosphor wheel illustrated in FIG. 19.

FIG. 25 is a cross-sectional schematic view of another example of the cooling structure of the phosphor wheel illustrated in FIG. 19.

FIG. 26 is a cross-sectional schematic view of another example of the cooling structure of the phosphor wheel illustrated in FIG. 19.

FIG. 27 is a schematic diagram illustrating a configuration example of a projection display apparatus provided with the light source unit illustrated in FIG. 11.

FIG. 28 is a characteristic diagram illustrating a change in phosphor temperature in each of experimental examples (an experimental example 1 to an experimental example 4).

FIG. 29 is a characteristic diagram illustrating illumination system outputs in relation to excitation light outputs in the experimental example 1 and the experimental example 4.

MODES FOR CARRYING OUT THE INVENTION

In the following, some embodiments of the present disclosure are described in detail with reference to drawings. The following description is a specific example of the present disclosure, and the present disclosure is not limited to the following embodiments. Moreover, the present disclosure is not limited to positions, dimensions, dimension ratios, and other factors of respective components illustrated in the drawings. It is to be noted that order for description is as follows.

1. First Embodiment (a light source unit using a phosphor wheel provided with a heat sink including a plurality of fins)
　1-1. Configuration of Phosphor Wheel
　1-2. Configuration of Light Source Unit
　1-3. Workings and Effects 2. Second Embodiment (an example of a phosphor wheel provided with a ceramic phosphor layer)

3. Third Embodiment (an example of a phosphor wheel provided with a water glass phosphor layer)

4. Modification Example 1 (an example in which fins of each member are disposed alternately in a cross-sectional view)

5. Modification Example 2 (an example of breaking a temperature boundary layer within a plane of a fin)

6. Fourth Embodiment (an example in which heat exchange fins are disposed between fins of each member)

7. Application Examples (projection display apparatus)

8. Examples

1. First Embodiment

FIG. 1 is an exploded perspective view of a configuration of a phosphor wheel 1 according to a first embodiment of the present disclosure. FIG. 2 is a perspective view of the configuration of the phosphor wheel 1 in a case where each member illustrated in FIG. 1 is combined. FIG. 3 illustrates a cross-sectional configuration of the phosphor wheel 1 taken along line I-I illustrated in FIG. 2. The phosphor wheel 1 configures a light source optical system (light source unit 100) of a later-described projection display apparatus (projector 10), for example (refer to FIGS. 11 and 26). The phosphor wheel 1 is a so-called binderless phosphor wheel in which a phosphor layer 12 is formed by sealing phosphor particles between a pair of substrates (a wheel substrate 11 and a cover glass 13) that are disposed to face each other. In the present embodiment, heat dissipation members (an outer spacer 14, a wheel heat sink 15, and a glass holder heat sink 16) are provided for each of the wheel substrate 11 and the cover glass 13. These heat dissipation members each have a configuration in which a plurality of fins (fins 14a, 14b, 15a, 15b, 16a, and 16b) is spaced apart from each other along the periphery. It is to be noted that FIG. 1, FIG. 2, and FIG. 3 each schematically illustrate a configuration of the phosphor wheel 1, and may differ in its actual size or shape in some cases.

(1-1. Configuration of Phosphor Wheel)

The phosphor wheel 1 has a configuration in which the phosphor layer 12 and the cover glass 13 are laminated in this order on the wheel substrate 11 having a circular shape (for example, a disk shape). The outer spacer 14 is fixed to an outer edge of the wheel substrate 11. The wheel heat sink 15 is provided at the periphery on side of a rear face (surface S2) of the wheel substrate 11. The glass holder heat sink 16 is provided at the periphery on side of a front face (surface S1) of the cover glass 13. The wheel substrate 11 and the cover glass 13 are fixed to a motor 20 by means of a screw 21 and by, for example, an inner plate 17, and are rotatable around an axis J20, for example.

The wheel substrate 11 has an annular shape with an opening 11H in the middle, supports the phosphor layer 12, and also serves as a heat dissipation member. The wheel substrate 11 has high thermal conductivity, and preferably has light reflectivity. The wheel substrate 11 includes an inorganic material such as a metal material or a ceramic material for which mirror finishing is applicable, for example. Specific examples of the metal material include simple metals such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), and palladium (Pd), and alloys including one or more kinds thereof. Alternatively, it is possible to use, as a metal material configuring the wheel substrate 11, alloys such as CuW having a W content rate of equal to or greater than 80 atom % or CuMo having a Mo content rate of equal to or greater than 40 atom %. Examples of the ceramic material include silicon carbide (SiC), aluminum nitride (AlN), beryllium oxide (BeO), a composite material of Si and SiC, or a composite material of SiC and Al (provided that the composite material has a SiC content rate of 50% or greater).

Further, a reflection film is preferably formed on side of the surface S1 on which the phosphor layer 12 of the wheel substrate 11 is formed. The reflection film includes, for example, a metal film including a metal element such as aluminum (Al), silver (Ag), or titanium (Ti), in addition to a dielectric multilayer film. The reflection film so functions as to reflect excitation light EL1 applied from the outside (for example, laser light, refer to FIG. 11) or fluorescence FL derived from the phosphor layer 12 (refer to FIG. 11) and as to improve light emission efficiency of the phosphor wheel 1.

It is to be noted that the wheel substrate 11 may not have light reflectivity in a case of forming the reflection film. In such a case, it is possible to use quartz or glass in addition to crystalline materials such as a simple substance Si, SiC, diamond, or sapphire. Further, an antireflection film is preferably provided on a surface (the surface S2, the rear face) opposite to the side of the surface S1 on which the phosphor layer 12 of the wheel substrate 11 is formed.

The phosphor layer 12 includes the phosphor particles, and is formed by filling, with the plurality of phosphor particles, a space formed by the wheel substrate 11, the cover glass 13, and a pair of gaskets 18A and 18B. The phosphor layer 12 is formed in an annular shape, for example. The phosphor particles are phosphors in a particle shape that absorb the excitation light EL1 applied from the outside and emit the fluorescence FL. As the phosphor particles, a fluorescent material is used that is excited by blue laser light having a wavelength of a blue color wavelength region (for example, 400 nm to 470 nm) and emits yellow fluorescence (light in a wavelength region from a red color wavelength region to a green color wavelength region). For such a fluorescent material, a YAG (yttrium aluminum garnet) based material is used, for example. In a case where the mean particle diameter of the phosphor particles is in a range from 20 µm to 25 µm, for example, the thickness of the phosphor layer 12 is preferably in a range from 40 µm to 60 µm, for example. However, a temperature in phosphor does not differ greatly so long as the mean particle diameter is smaller than 100 µm.

The cover glass 13 has an annular shape with the opening 13H in the middle, for example. The cover glass 13 serves to hold, on the wheel substrate 11, the phosphor particles configuring the phosphor layer 12. The cover glass 13 is configured by a material having light transmissivity, and thus have a property of transmitting therethrough the excitation light EL1 and the fluorescence FL that is converted by the phosphor particles. Examples of a constituent material of the cover glass 13 include quartz, glass, sapphire, and crystal. Of these, it is preferable to use sapphire having high thermal conductivity. In addition, in a case where a light source having a low output is used in the later-described light source unit 100, it is possible to use a resin material such as polyethylene terephthalate (PET) or silicone resin.

As illustrated in FIG. 1 and FIG. 6, for example, the outer spacer 14 has a disk shape (specifically, an annular shape) with an opening 14H in the middle. The outer spacer 14 serves to control the thickness of the phosphor layer 12 by fixing to the outer edge of the wheel substrate 11. The outer spacer 14 has a groove 14A for the gasket 18A that seals a side face on side of an outer circumferential of the phosphor layer 12. Further, the outer spacer 14 also functions as a heat dissipation member that allows heat generated due to Stokes loss to dissipate. The heat generated due to Stokes loss occurs when the phosphor particles absorb the excitation light EL1 to emit the fluorescence FL. For this reason, the outer spacer 14 is preferably configured by a material having high thermal conductivity. Specifically, it is desirable that the outer spacer 14 include a pure aluminum-based material.

As illustrated in FIG. 4, a plurality of fins (sixteen pieces in FIG. 4) are provided at the periphery of the outer spacer 14. The plurality of fins are so disposed as to be spaced apart from each other along the periphery of the outer spacer 14, and are provided by making some cuts C at the periphery. In other words, the plurality of fins are spaced apart from each other by the cuts C. The plurality of fins are configured, for example, by two types of fins (the fin 14a and the fin 14b). The fin 14a and the fin 14b are alternately disposed at the periphery of the outer spacer 14. Of these, the fin 14a is used as a fixing part for fixing the later-described glass holder heat sink 16. In this way, providing the plurality of fins that are spaced apart from each other at the periphery of the outer spacer 14 allows the heat dissipation efficiency of the phosphor layer 12 through the outer spacer 14 to be improved.

Further, the fin 14a and the fin 14b preferably have a difference in level from each other. In the present embodiment, the fin 14a is formed within the same plane as an inner circumferential part of the outer spacer 14, for example. A root of the fin 14b is, for example, folded toward side of the wheel heat sink 15 (side of the surface S2), for example, to form a surface that is closer to the wheel heat sink 15 than the fin 14a. Although described in detail later, this causes a temperature boundary layer within the plane of the outer spacer 14 to be broken to thereby further improve the heat dissipation efficiency of the phosphor layer 12 through the outer spacer 14.

Further, as illustrated in FIG. 5, in the outer spacer 14, the fin 14b may be divided into a plurality of pieces (for example, three pieces of a fin 14b1, a fin 14b2, and a fin 14b3). At this time, the adjacent fins 14b1, 14b2, and 14b3 each preferably have a difference in level from one another, as with the above-described fin 14a and fin 14b. It is to be noted that FIG. 5 illustrates an example in which the fin 14b2 is formed within the same plane as the surface of the inner circumferential part of the outer spacer 14, as with the fin 14a, and the fins 14b1 and the fins 14b3 are so formed as to be lower by one level toward the side of the wheel heat sink 15. However, this is not limitative. For example, the fins 14a, 14b1, 14b2, and 14b3 may be each so formed as to include a plane having a different height from one another.

The wheel heat sink 15 dissipates, from side of the wheel substrate 11, heat generated due to Stokes loss when the phosphor particles absorb the excitation light EL to emit the fluorescence FL, as with the outer spacer 14. The wheel heat sink 15 is preferably configured by a material having high thermal conductivity. For example, it is desirable that the wheel heat sink 15 be configured by a pure aluminum-based material, as with the outer spacer 14.

As illustrated in FIG. 1 and FIG. 6, the wheel heat sink 15 has a disk shape (specifically, an annular shape) with an opening 15H in the middle. The wheel heat sink 15 includes an inner circumferential part 15R1 that is in contact with the rear face (surface S2) of the wheel substrate 11, and a periphery 15R2 that forms a plane at a position away from the rear face of the wheel substrate 11. A plurality of fins (eight pieces in FIG. 6) is provided at the periphery 15R2. The plurality of fins are so disposed as to be spaced apart from each other along the periphery of the wheel heat sink 15, as with the plurality of fins 14a and 14b provided at the outer spacer 14, and are provided by making some cuts C at the periphery. This causes the temperature boundary layer within the plane of the periphery 15R2 of the wheel heat sink 15 to be broken, and thereby improves the heat dissipation efficiency of the phosphor layer 12 through the wheel heat sink 15.

As illustrated in FIG. 6, for example, the plurality of fins are configured by two types of fins (the fin 15a and the fin 15b). The two types of fins (the fin 15a and the fin 15b) are preferably disposed alternately, and preferably have a difference in level from each other. In the present embodiment, the fin 15b is formed within the same plane as the periphery 15R2 of the wheel heat sink 15, for example. A root of the fin 15a is, for example, so folded as to be farther away from the outer spacer 14 to form a surface at a position farther away from the outer spacer 14 than the surface on which the fin 15b is formed.

It is to be noted that FIG. 6 illustrates an example in which eight pieces of fins are provided as the plurality of fins of the wheel heat sink 15. However, this is not limitative. Further, the present embodiment illustrates the example in which the fins 15a and 15b having two different heights are alternately disposed. However, fins having three or more different heights may be provided.

The glass holder heat sink 16 serves to fix the cover glass 1 and to constantly apply a pressure to the gasket 18A to thereby prevent the leakage of the phosphor particles from the space formed by the wheel substrate 11, the cover glass 13, and the pair of gaskets 18A and 18B. For this reason, the glass holder sink 16 is preferably configured by a spring material. Further, the glass holder heat sink 16 serves to dissipate, from side of the cover glass 13, heat generated when the phosphor particles absorb the excitation light EL to emit the fluorescence FL. For this reason, the glass holder heat sink 16 is preferably configured by a material having high thermal conductivity. Examples of such a material include beryllium copper.

The glass holder heat sink 16 has a disk shape (specifically, an annular shape) with an opening 16H in the middle, as with the glass holder heat sink 16A illustrated in FIG. 7, for example. The plurality of fins (sixteen pieces in FIG. 7) that are spaced apart from each other by the cuts C are provided at the periphery of the glass holder heat sink 16. The plurality of fins are, for example, two types of fins (the fin 16a and the fin 16b) that are alternately disposed. Of these, the fin 16a is used as a fixing part for fixing the glass holder heat sink 16 to the outer spacer 14.

The fin 16a and the fin 16b preferably have a difference in level from each other. For example, a root of the fin 16a is folded toward side of the outer spacer 14 to thereby form a plane closer to the outer spacer 14 than the plane of the glass holder heat sink 16. The fin 16b is formed within the same plane as an inner circumferential part of the glass holder heat sink 16. In this way, providing the plurality of fins that are spaced apart from each other at the periphery of the glass holder heat sink 16 and that have the difference in level from each other causes the temperature boundary layer within the plane of the glass holder heat sink 16 to be broken, and thereby improves the heat dissipation efficiency of the phosphor layer 12 through the glass holder heat sink 16. It is to be noted that the fins 14a and 16a are provided with respective opening holes 14h and 16h at positions facing each other, and integrated by a screw (not illustrated), for example.

Further, as illustrated in FIG. 8, in the glass holder heat sink 16, the fin 16b may be divided into a plurality of pieces (for example, three pieces of a fin 16b1, a fin 16b2, and a fin 16b3). At this time, the fins 16b1, 16b2, and 16b3 that are adjacent to each other each preferably have a difference in level from one another, as with the above-described fin 16a and fin 16b. It is to be noted that FIG. 8 illustrates an example in which the fins 16b1 and 16b3 are formed within the same plane as the inner circumferential part of the glass holder heat sink 16, as with the fin 16a, and the fin 16b2 is so formed as to be lower by one level toward the side of the wheel heat sink 15. However, this is not limitative. For example, the roots of the fins 16b1 and 16b3 may be raised toward a side opposite to the side of the wheel heat sink 15 to allow the fins 16b1 and 16b3 to be formed higher by one level from the plane of the inner circumferential part of the glass holder heat sink 16.

The inner plate 17 serves to fix the phosphor wheel 1 to the motor 20. Further, the inner plate 17 constantly applies a pressure to the gasket 18B to thereby prevent the leakage of the phosphor particles from the space formed by the wheel substrate 11, the cover glass 13, and the pair of gaskets 18A and 18B. The inner plate 17 is preferably configured by a spring material, as with the glass holder heat sink 16, and preferably has high thermal conductivity. Examples of such a material include beryllium copper.

As described above, the gaskets 18A and 18B seal the phosphor particles between the wheel substrate 11 and the cover glass 13, and maintain an interval between the wheel substrate 11 and the cover glass 13. The gaskets 18A and 18B preferably have heat resistance. For example, a silicon-based gasket is preferably used for the gaskets 18A and 18B.

The phosphor wheel 1 is rotatably supported, and, upon operation of the light source unit 100, rotates around the axis J20 that passes through the center of each member illustrated in FIG. 1 as a rotation center, for example. The diameter of the phosphor wheel 1 (specifically, the diameter of the wheel substrate 11, for example) is, for example, about 50 mm to about 70 mm, and the phosphor wheel 1 rotates by means of the motor 20 at a rotation speed of, for example, 2,400 rpm to 10,800 rpm. The phosphor wheel 1 is rotated in this way in order to suppress a local temperature rise caused by the application of the excitation light EL1, to maintain structural stability, and to prevent a decrease in light conversion efficiency.

It is to be noted that FIGS. 1 to 3 illustrate the example in which the outer spacer 14, the wheel heat sink 15, and the glass holder heat sink 16 each have the two types of fins (the fins 14a, 14b, 15a, 15b, 16a, and 16b) that are so disposed as to be spaced apart from each other along the periphery. However, this is not limitative. For example, as illustrated in FIG. 9, the two types of the fins 14a and 14b that are spaced apart from each other may be provided at the periphery of only the outer spacer 14, and the wheel heat sink 15 and the glass holder heat sink 16 may simply have an annular shape. Further, the plurality of fins do not necessarily have to be provided at the periphery of the outer spacer 14. For example, as illustrated in FIG. 10, a configuration may be employed in which the outer spacer 14 simply has an annular shape, and the wheel heat sink 15 and the glass holder heat sink 16 each have the two types of the fins 15a, 15b, 16a, and 16b that are spaced apart from each other at the periphery. In this way, providing the plurality of fins at one or more peripheries of the heat dissipation members configuring the phosphor wheel 1 improves the heat dissipation performance of the heat dissipation member, and improves the heat dissipation efficiency of the phosphor layer 12.

(1-2. Configuration of Light Source Unit)

FIG. 11 is a schematic diagram illustrating an overall configuration of the light source unit 100. The light source unit 100 includes the phosphor wheel 1, a diffusion plate 121, a light source section 110 that emits excitation light or laser light, lenses 112 to 115, a dichroic mirror 116, and a reflection mirror 117. The phosphor wheel 1 is, for example, a reflection type light-emitting device, and is rotatably supported by an axis J121. The diffusion plate 121 is rotatably supported by the axis J121. The light source section 110 includes a first laser group 110A and a second laser group 110B. A plurality of semiconductor laser devices 111A that oscillates excitation light (for example, the wavelength of 445 nm or 455 nm) are arranged in the first laser group 110A. A plurality of semiconductor laser devices 111B that oscillates blue laser light (for example, the wavelength of 465 nm) are arranged in the second laser group 110B. Here, for the purpose of convenience, excitation light that is oscillated from the first laser group 110A is defined as EL1, and blue laser light (hereinafter, simply referred to as blue light) that is oscillated from the second laser group 110B is defined as EL2.

The phosphor wheel 1 is so disposed as to allow the excitation light EL1 transmitted through the lens 112, the dichroic mirror 116, and the lens 113 in order from the first laser group 110A, to enter the phosphor layer 12. The fluorescence FL1 outputted from the phosphor wheel 1 is reflected by the dichroic mirror 116, and thereafter, transmitted through the lens 114, to thereby travel toward the outside, i.e., an illumination optical system 200 (described later). The diffusion plate 121 diffuses the blue light EL2 that has passed through the reflection mirror 117 from the second laser group 110B. The blue light EL2 diffused by the diffusion plate 121 is transmitted through the lens 115 and the dichroic mirror 116, and thereafter, transmitted through the lens 114, to thereby travel toward the outside, i.e., the illumination optical system 200. It is to be noted that it is desirable that a cooling fan be provided in the light source unit 100 in order to cool heat generated in the phosphor layer 12 caused by the application of the excitation light EL1.

(1-3. Workings and Effects)

As described previously, the light emission device (light source unit) using a semiconductor laser (LD) and a phosphor is used as a light source optical system for a projector in recent years. In the light emission device, the LD is used as a light source, and the phosphor is excited by the light outputted from the LD to thereby extract yellow light or white light. This light emission device has a structure which is called a so-called phosphor wheel in which a phosphor layer is provided on a rotatable wheel substrate.

In general, the phosphor layer is formed by, for example, mixing a cross-linking body (binder) of an inorganic material with a phosphor; the conversion efficiency to fluorescence by the phosphor wheel is considered to improve by enhancing the filling rate of phosphor particles per unit volume. In the phosphor layer formed by mixing with the binder, it is difficult to shorten the distance between the particles due to the binder that is present between the particles. Further, it is difficult to enhance the filling rate. For this reason, a phosphor wheel without a binder (binderless phosphor wheel) has been developed.

Incidentally, light emission intensity of a phosphor deteriorates due to temperature quenching caused by a temperature rise. A phosphor layer formed only with phosphor particles tends to be lower in thermal conductivity than a phosphor layer including a binder. Therefore, there is a possibility that a sufficient luminance may not be obtained from a light source unit using a binderless phosphor wheel.

In contrast, in the present embodiment, the plurality of fins are provided along the periphery of the heat dissipation members that are attached to the binderless phosphor wheel 1 in which the phosphor particles are sealed between the wheel substrate 11 and the cover glass 13 that are so disposed as to face each other. Specifically, the plurality of fins (for example, the fins 14*a* and 14*b*) that are spaced apart from each other are provided at any of, or preferably all of, the peripheries of the outer spacer 14 provided at the outer edge of the wheel substrate 11, the wheel heat sink 15 provided at the peripheral edge of side of the rear face (the surface S2) of the wheel substrate 11, and the glass holder heat sink 16 provided at the peripheral edge of the cover glass 13. This improves the heat dissipation efficiency of heat generated upon absorbing the excitation light EL and emitting the fluorescence FL, thereby making it possible to improve the cooling efficiency of the phosphor layer 12.

As described above, in the light source unit 100 of the present embodiment, the plurality of fins (for example, the fins 14*a* and 14*b*) are so provided as to be spaced apart from each other along the periphery of the heat dissipation member (for example, the outer spacer 14) that is provided at the peripheral edge of the phosphor wheel 1. This improves the cooling efficiency of the phosphor layer 12 and reduces the temperature quenching of the phosphor. Accordingly, it is possible to improve luminance in the light source unit 100.

Further, in the present embodiment, the differences in level are provided between the plurality of fins provided on the heat dissipation members. Specifically, two types of the fins (the fins 14*a* and 14*b*) are provided on the outer spacer 14, for example. The one (the fin 14*a*) is formed within the same plane as the plane of the inner circumferential part of the outer spacer 14, and the other (the fin 14*b*) is formed at a position lower by one level than the plane of the inner circumferential part of the outer spacer 14 by folding the root of the fin 14*b*, for example, toward side of the rear face (the surface S2) of the wheel substrate 11. These are alternately disposed to thereby configure a so-called offset fin structure.

In general, there are mainly two methods for improving thermal conductivity of a certain base. The one is a method of thinning the temperature boundary layer formed around the base. The other one is a method of breaking the temperature boundary layer formed around the base. The temperature boundary layer becomes thicker as the length of a surface of the base is longer. Therefore, in order to enhance heat dissipation performance of the base, shortening the length of the surface of the base or dividing the surface of the base into several pieces are considered. Alternatively, providing, on the surface of the base, a structure that breaks the temperature boundary layer is also considered.

In the present embodiment, as described above, the two types of the fins 14*a* and 14*b* (the fins 14*a*, 14*b*1, 14*b*2, and 14*b*3), 15*a*, 15*b*, and the fins 16*a* and 16*b* (the fins 16*a*, 16*b*1, 16*b*2, and 16*b*3), each set having a difference in level from each other, are alternately disposed on corresponding one of the outer spacer 14, the glass holder heat sink 16, and the wheel heat sink 15 which are the heat dissipation members of the phosphor wheel 1. This breaks the temperature boundary layer formed around the fins 14*a* and 14*b*, for example, and thus thins the temperature boundary layer, making it possible to further improve the heat dissipation performance of the heat dissipation members such as the outer spacer 14. Accordingly, it is possible to further enhance the cooling efficiency of the phosphor layer 12 and further improve the luminance of the light source unit 100 provided with the phosphor layer 12.

Next, description is given of second to fourth embodiments and modification examples 1 and 2. In the following, similar components to those of the above-described first embodiment are denoted by the same reference numerals, and description thereof may be omitted as appropriate.

2. Second Embodiment

FIG. 12 is an exploded perspective view of a configuration of a phosphor wheel 2 according to a second embodiment of the present disclosure. Similarly to the phosphor wheel 1 according to the first embodiment, the phosphor wheel 2 configures a light source optical system (the light source unit 100) of a projection display apparatus (the projector 10) (refer to FIGS. 11 and 26), for example. The present embodiment differs from the above-described first embodiment in that a phosphor layer 22 is formed with a so-called ceramic phosphor. It is to be noted that FIG. 12 schematically illustrates a configuration of the phosphor wheel 2, and may differ in its actual size or shape in some cases.

The phosphor wheel 2 of the present embodiment has a configuration in which the phosphor layer 22 is disposed on the wheel substrate 11 having a circular shape (for example, a disk shape). The outer spacer 14 is fixed to the outer edge of the wheel substrate 11, and the wheel heat sink 15 is provided at the periphery on side of the rear face (the surface S2) of the wheel substrate 11. The wheel substrate 11 is fixed to the motor 20 by means of the screw 21 and by, for example, the inner plate 17, and is rotatable around the axis J20, for example. The phosphor layer 22 is fixed on the wheel substrate 11 by the glass holder heat sink 16 holding the periphery of the phosphor layer 22 and by the inner plate 17 holding the inner circumferential part of the phosphor layer 22.

The phosphor layer 22 has an annular shape with an opening 22H inside the disk shape, and is configured by a ceramic phosphor as described above. The phosphor layer 22 is formed using one or two or more of the following phosphors of silicate, aluminate, phosphate, halo-phosphate, borate, oxide, tungstate, salt of vanadic acid, oxy sulfide, sulfide, nitride, oxy nitride, for example. It is possible to form the phosphor layer 22 as below, for example. First, a phosphor powder is obtained through a coprecipitation method, a solid reaction method, a gas-phase reaction method in which various gasses and a solid substance are reacted to each other, and the like. Thereafter, the obtained phosphor powder is baked at an appropriate temperature, thereby to adjust grain size, composition, uniformity, internal defects or the like of the baked body. The obtained phosphor powder is molded into a suitable shape through rubber pressing, followed by conducting a HIP treatment, to thereby obtain a ceramic phosphor (the phosphor layer 22). The phosphor layer 22 is so formed as to have a thickness in a range from 50 μm to 200 μm, for example.

In addition, it is preferable to form an antireflection film on side of an incident surface of the excitation light EL1, of the phosphor layer 22 of the present embodiment. Further, it is preferable to form a high reflection film such as a dielectric multilayer film or a silver mirror plating metal plate on a face (the back face) opposite to the incident surface of the phosphor layer 22. This improves light extraction efficiency and thus makes it possible to improve luminance. In addition, the high reflection film does not necessarily have to be provided on the back face of the phosphor layer 22, and may be formed on the wheel substrate 11. Further, in a case of providing the high reflection film on the back face of the phosphor layer 22, the wheel substrate 11 does not necessarily have to be provided. For example, the outer spacer 14 may also serve as the wheel substrate 11. Using a member in which the outer spacer 14 and the wheel substrate 11 are integrated reduces the number of locations of contact thermal resistance and improves the cooling efficiency of the phosphor layer 22.

Processing the phosphor layer 22 into an annular shape may possibly lead to the reduction of yield upon manufacturing as the size increases, or may increase cost due to damage, etc., upon handling. For this reason, as illustrated in FIG. 13, quarter pieces of the phosphor layer 22 may be fabricated, for example, and four of the quarter pieces of the phosphor layer 22 are so combined as to form the phosphor layer 22 having an annular shape. This makes it possible to reduce cost.

Further, the present embodiment illustrates an example in which the phosphor layer 22 is mechanically fixed to the wheel substrate 11 by the glass holder heat sink 16 and the inner plate 17. However, this is not limitative, and the phosphor layer 22 may be installed on the wheel substrate 11 using an adhesive. In this case, a transparent adhesive is preferably used. One reason for this is that, in a case of using a colored adhesive, the adhesive burns due to heat generation caused by light absorption upon transmission of the excitation light EL1 through the phosphor layer 22, which may possibly lead to detachment or crack of the phosphor layer 22. Further, as in the present embodiment, in a case of mechanically fixing the phosphor layer 22 to the wheel substrate 11 by the glass holder heat sink 16 and the inner plate 17, it is preferable to form, on the wheel substrate 11, a groove that fits the shape of the phosphor layer 22. This makes it possible to prevent dislocation, etc., of the phosphor layer 22.

As described above, for the phosphor wheel 2 of the present embodiment, the example in which a ceramic phosphor is used to form the phosphor layer 22 is illustrated. However, providing the fins at the peripheries of the heat dissipation members (the outer spacer 14, the wheel heat sink 15, and the glass holder heat sink 16) of the phosphor wheel 1 allows a similar effect to that of the above-described first embodiment to be obtained.

In addition, the present embodiment illustrates an example in which a ceramic phosphor is used as the phosphor layer 22. However, this is not limitative. In the phosphor wheel 2 of the present embodiment, as the phosphor 22, for example, an inorganic material including low melting point glass as a binder may be used, or a configuration utilizing a sintered plate including a single phosphor may be used.

3. Third Embodiment

FIG. 14 is an exploded perspective view of a configuration of a phosphor wheel 3 according to a third embodiment of the present disclosure. Similarly to the phosphor wheel 1 according to the first embodiment, etc., the phosphor wheel 3 configures a light source optical system (the light source unit 100) of a projection display apparatus (the projector 10) (refer to FIGS. 11 and 26). The present embodiment differs from the above-described first embodiment and second embodiment in that a phosphor layer 32 formed by combining phosphor particles with each other by a binder is used. It is to be noted that FIG. 14 schematically illustrates a configuration of the phosphor wheel 3, and may differ in its actual size or shape in some cases.

In the phosphor wheel 3 of the present embodiment, the phosphor layer 32 is formed on the wheel substrate 11 having a circular shape (for example, a disk shape). The outer spacer 14 is fixed to the outer edge of the wheel substrate 11, and the wheel heat sink 15 is provided at the periphery on side of the rear face (the surface S2) of the wheel substrate 11. The wheel substrate 11 is fixed to the motor 20 by means of the screw 21 and by, for example, the inner plate 17, and is rotatable around the axis J20, for example.

The phosphor layer 32 includes a plurality of phosphor particles that is combined with one another by the binder. The binder combines adjacent phosphor particles and other phosphor particles with one another, and also combines the phosphor particles and a surface of the wheel substrate 11 with each other. The binder includes, for example, a cross-linking body of an inorganic material such as water glass. The water glass is a silicate compound which is called sodium silicate, potassium silicate, or silicate soda, and is a liquid of a mixture of SiO2 (silica) with Na2O (sodium oxide) or K2O (potassium oxide) at a predetermined ratio. The molecular formula thereof is expressed as Na2O.nSiO2. Further, a binder including an organic material may be used.

In addition, it is preferable to provide a reflection film (not illustrated) on a surface of the wheel substrate 11. The reflection film is formed with a metal film, etc. including a metal element such as Al (aluminum), Ag (silver), or Ti (titanium), in addition to the dielectric multilayer film, for example. The reflection film so functions as to reflect the excitation light EL applied from the outside (for example, laser light) or the fluorescence FL generated at the phosphor layer 32 to enhance light emission efficiency in the phosphor wheel 3.

As described above, for the phosphor wheel 3 of the present embodiment, an example is given where the phosphor layer 32 is used in which the phosphor particles are combined using a binder. However, providing the fins at the peripheries of the heat dissipation members (the outer spacer 14, the wheel heat sink 15, and the glass holder heat sink 16) of the phosphor wheel 1 allows a similar effect to that of the above-described first embodiment to be obtained.

In addition, as in the present embodiment, in the phosphor wheel 3 using the phosphor layer 32 in which the phosphor particles are combined using the binder, the cover glass 13 described in the first embodiment does not necessarily have to be provided on the phosphor layer 32. However, providing the cover glass 13 allows for the attachment of the glass holder heat sink 16. This makes it possible to improve cooling performance.

4. Modification Example 1

FIG. 15A illustrates a cross-sectional configuration of a phosphor wheel 4 according to a modification example 1 of the present disclosure. FIG. 15B is an exploded perspective view of the phosphor wheel 4 of the present modification example. The phosphor wheel 4 configures a light source optical system (the light source unit 100) of a projection display apparatus (the projector 10) (refer to FIGS. 11 and 26), for example. The phosphor wheel 4 includes the phosphor layer 22 configured by the ceramic phosphor, for example. In the present modification example, differences in level between the fin 44a and the fin 44b, the fin 45a and the fin 45b, and the fin 46a and the fin 46b are so formed as to be larger than those of the above-described first embodiment, etc. The fin 44a and the fin 44b, the fin 45a and the fin 45b, and the fin 46a and the fin 46b are provided at the peripheries of, respectively, an outer spacer 44, a wheel heat sink 45, and a glass holder heat sink 46, which are dissipation members of the phosphor wheel 4.

This allows the fin 44a of the outer spacer 44 to be disposed between the fin 46a and the fin 46b of the glass holder heat sink 46 and allows the fin 44b of the outer spacer 44 to be disposed between the fin 45a and the fin 45b of the wheel heat sink 45, in the cross-sectional structure of the phosphor wheel 4, for example, as illustrated in FIG. 15A. This further improves the cooling efficiency of the phosphor layer 22, and further reduce temperature quenching of the phosphor. Accordingly, it is possible to further improve the luminance of the light source unit 100.

In addition, as in the present modification example, in a case of adopting a configuration in which the fin 44a and the fin 44b of the outer spacer 44 and the fin 46a and the fin 46b of the glass holder heat sink 46 are alternately disposed in a cross-sectional view, opening holes 44h and 46h for fixing the glass holder heat sink 46 to the outer spacer 44 are provided at an inner circumferential part of each component, as illustrated in FIG. 15B. The opening holes 44h and 46h are provided at the inner circumferential part of each component, and fastened by means of a screw 41, for example, as illustrated in FIG. 15A, thereby making it possible to increase power to hold the phosphor layer 22 configured by the ceramic phosphor and to prevent dislocation, etc., of the phosphor layer 22.

Further, in the phosphor wheel 4 of the present modification example, as illustrated in FIG. 16, folded positions X and Y from respective inner circumferential parts 45R1 of the fins 45a and 45b of the wheel heat sink 45 are so dislocated as to have a structure offset from respective root parts of the fins 45a and 45b. This makes it possible to further improve the cooling efficiency of the phosphor layer 22 by the wheel heat sink 45.

5. Modification Example 2

FIG. 17A is a perspective view of a configuration of a phosphor wheel 5 according to a modification example 2 of the present disclosure. FIG. 17B is an enlarged schematic view of a fin 56b of a glass holder heat sink 56 illustrated in FIG. 17A. Similarly to the above-described embodiments, the phosphor wheel 5 has a configuration in which the glass holder heat sink 56 including a plurality of the fins 56b that is so disposed as to be spaced apart from each other along the periphery is provided on one base (the cover glass 13) out of bases (the wheel substrate 11 and the cover glass 13) including a pair of thin plates that are so disposed as to face each other with the phosphor layer 12 interposed therebetween. The present modification example differs from the above-described embodiments in that one or more irregular structures (for example, a recessed part 56X) are formed on a surface of the fin 56b. It is to be noted that FIG. 17A and FIG. 17B schematically illustrate a configuration of the phosphor wheel 5 and a shape of the recessed part 56X, and may differ in their actual size or shape in some cases.

One or more of the recessed parts 56X (five pieces in each of FIG. 17A and FIG. 17B) are provided on a surface of each of the plurality of fins 56b of the glass holder heat sink 56. The recessed parts 56X are depressions provided on the surface of the fin 56b, similarly to dimples formed on a surface of a golf ball, for example. Providing the recessed parts 56X on the surface of the fin 56b in this way allows surface area, i.e., heat dissipation area, of the fin 56b to increase. Further, the temperature boundary layer of the surface of the fin 56b is broken. This improves the heat dissipation efficiency in the fin 56b, making it possible to further improve the heat dissipation performance of the glass holder heat sink 56. Accordingly, the cooling efficiency of the phosphor layer 12 is improved, and thereby, it is possible to further improve the luminance of the light source unit 100 provided with the phosphor wheel 5.

It is to be noted that the shape of the recessed part 56X is not limitative. In the present modification example, the recessed part is illustrated as an example of the irregular structure. However, the shape is not limitative, and may be formed to have a raised part or may be formed to have both of a recessed part and a raised part. Further, in order to break the temperature boundary layer formed on the surface of the fin 56b, the fin 56b itself may be processed to have a wave form, as illustrated in FIG. 18, for example. Further, similarly to the glass holder heat sink 56 of the present modification example, providing the recessed part 56X not only at the glass holder heat sink but also at the wheel heat sink makes it possible to further improve the heat dissipation performance of the wheel heat sink.

6. Fourth Embodiment

FIG. 19 is a perspective view of an appearance of a phosphor wheel 6 according to a fourth embodiment of the present disclosure. FIG. 20 illustrates a cross-sectional configuration of a phosphor wheel 6 taken along line II-II illustrated in FIG. 19. The phosphor wheel 6 configures a light source optical system (the light source unit 100) of a projection display apparatus (the projector 10), for example, (refer to FIGS. 11 and 26). The phosphor wheel 6 is a so-called binderless phosphor wheel in which the phosphor layer 12 is formed by sealing the phosphor particles between a pair of substrates (the wheel substrate 11 and the cover glass 13) that are so disposed as to face each other. In the present embodiment, the phosphor wheel 6 is contained in a housing 60, for example, and has a configuration in which heat exchange fins 61 (61a, 61b, 61c, 61d, 61e1, and 61e2) are disposed between the fins 14a, 14b, 15a, 15b, 16a, and 16b of the heat dissipation members, at the rear face of the wheel heat sink 15, and at the front face of the glass holder heat sink 16. The heat exchange fin 61 is held by the housing 60, for example. It is to be noted that FIG. 19 and FIG. 20 schematically illustrate a configuration of the phosphor wheel 1, and may differ in its actual size or shape in some cases.

The housing 60 has a cylindrical shape having a space therein, for example. Specifically, as illustrated in FIG. 21, the housing 60 is configured by a front face part 60A to which a lens 62 is attached, a rear face part 60H, and a plurality of ring-shaped parts 60B to 60G (here, six pieces). The ring-shaped parts 60B to 60G are disposed between the front face part 60A and the rear face part 60H. The heat exchange fins 61a, 61b, 61c, 61d, 61e1, and 61e2 are disposed between each of the front face part 60A, the ring-shaped parts 60B to 60G, and the rear face part 60H. Fastening them by means of a screw, for example, allows the housing 60 to have a sealed structure. The housing 60 is formed, for example, by means of die casting, and with a resin, etc.

The heat exchange fins 61 (61a, 61b, 61c, 61d, 61e1, and 61e2) absorb heat that is propagated from the phosphor layer 12 to each of the heat dissipation members (the outer spacer 14, the wheel heat sink 15, and the glass holder heat sink 16). For example, as illustrated in FIG. 21, the heat exchange fin 61 has a plate-shaped member with an opening 61H in the middle, and is held by the housing 60. Specifically, as described above, the heat exchange fins 61 are interposed between each of the front face part 60A, the ring-shaped parts 60B to 60H, and the rear face part 60H, and, thereby, disposed between the fins 14a, 14b, 15a, 15b, 16a, and 16b of the heat dissipation members, behind the wheel heat sink 15, and before the glass holder heat sink 16. It is preferable that the heat dissipation fin 61 be configured by a material having high thermal conductivity. Specifically, it is desirable that the heat dissipation fin 61 be configured by a pure aluminum-based material, copper (Cu), a carbon (C), etc. It is to be noted that the heat exchange fin 61 does not necessarily have to be formed as a single-piece plate, and may be divided into two or more pieces.

As described above, the phosphor wheel 6 of the present embodiment has a configuration in which the heat exchange fins 61a, 61b, 61c, 61d, 61e1, and 61e2 are disposed between the fins 14a, 14b, 15a, 15b, 16a, and 16b of the heat dissipation members, and before the wheel heat sink 15 and behind the glass holder heat sink 16. The interval between each of the fins 14a, 14b, 15a, 15b, 16a, and 16b of the heat dissipation member and each of the heat exchange fins 61a, 61b, 61c, 61d, 61e1, and 61e2 is preferably set as short as possible. The heat exchange fins 61a, 61b, 61c, 61d, 61e1, and 61e2 are disposed as near as possible, and thereby, heat transmitted from the phosphor layer 12 to each of the heat dissipation members (the outer spacer 14, the wheel heat sink 15, and the glass holder heat sink 16) through the wheel substrate 11, for example, is more likely to be absorbed by the heat exchange fin 61. This improves the heat dissipation efficiency of each of the heat dissipation members. As an example, the interval between each of the fins 14a, 14b, 15a, 15b, 16a, and 16b of the heat dissipation members and each of the heat exchange fins 61a, 61b, 61c, 61d, and 61e1 is preferably set to, for example, a range from 0.5 mm to 1 mm, in consideration of safety and reliability upon operation.

In general, a phosphor wheel is disposed in a sealed space for preventing dust. In the sealed space, for example, a fan and an internal heat sink are disposed as a heat exchanger, in addition to the phosphor wheel. Cooling of the phosphor wheel is performed by blowing air to the phosphor wheel by means of this fan to thereby absorb the resultant heat by means of the internal heat sink. The heat received by the internal heat sink is dissipated at an external heat sink outside the sealed space through a heat pipe. For this reason, a general phosphor wheel tends to have a larger heat exchanger.

In contrast, in the phosphor wheel 6 according to the present embodiment, the heat exchange fins 61 (61a, 61b, 61c, 61d, 61e1, and 61e2) that are inserted from the outside of the housing 60 into the inside of the housing 60 are disposed between the fins 14a, 14b, 15a, 15b, 16a, and 16b of the heat dissipation members configuring the phosphor wheel 6, at the rear face of the wheel heat sink 15, and at the front face of the glass holder heat sink 16, within a sealed container (the housing 60). This allows heat generated in the phosphor layer 12 by the application of the excitation light EL1 and transmitted to each of the heat dissipation members 14, 15, and 16 through the wheel substrate 11, etc. to be absorbed by the heat exchange fin 61 and dissipated to the outside. Accordingly, it is possible to cool the phosphor wheel 6 without installing, in the housing 60, heat exchangers such as the above-described fan or internal heat sink, thereby making it possible to reduce in size the light source unit 100 including the phosphor wheel 6. In addition, it is possible to reduce weight of the light source unit 100 and further save cost.

In addition, in the present embodiment, the heat exchange fins 61a, 61b, 61c, 61d, and 61e1 are disposed between the fins 14a, 14b, 15a, 15b, 16a, and 16b of the heat dissipation members, at the rear face of the wheel heat sink 15, and at the front face of the glass holder heat sink 16. However, the heat exchange fins do not necessarily have to be provided at all of them. Providing at least one heat exchange fin 61 makes it possible to improve the cooling efficiency of the entire phosphor wheel 6. Further, the number of the heat exchange fins 61 may be increased. For example, similarly to the heat exchange fin 61e2, increasing the number of the heat exchange fins 61 in the space at the rear face of the wheel heat sink 15 makes it possible to further improve the cooling efficiency of the entire phosphor wheel 6.

Further, although not illustrated, blowing air to the heat exchange fin 61 by means of a fan outside the housing 60 of the phosphor wheel 61, for example, improves the heat dissipation performance by the heat exchange fin 6. This further improves the cooling efficiency of the phosphor layer 12. Furthermore, FIG. 20 illustrates an example in which all of tips of the heat exchange fins 61a, 61b, 61c, 61d, 61e1, and 61e2 are located at the same position. However, the present disclosure is not limited thereto. For example, the heat exchange fins 61e1 and 61e2 that are disposed at the rear face of the wheel heat sink 15 may be extended close to the motor 20. This makes it possible to reduce a temperature around the motor 20, thereby making it possible to extend the life of the motor 20. In addition, FIG. 19, etc. illustrates an example in which the heat exchange fins 61 are continuous plate-shaped members between the fins 14a, 14b, 15a, 15b, 16a, and 16b of the phosphor wheel 6. However, the present disclosure is not limited thereto. For example, as illustrated in FIG. 22, the heat exchange fins 61 may be discontinuously interposed between the fins 14a, 14b, 15a, 15b, 16a, and 16b.

Further, as illustrated in FIG. 23, for example, a plurality of holes 61X may be provided for the heat exchange fins 61a, 61b, 61c, 61d, 61e1, and 61e2 at parts overlapping with the fins 14a, 14b, 15a, 15b, 16a, and 16b. This generates an air flow in an X-axis direction through the holes 61X to thereby improve heat absorption efficiency by each of the heat exchange fins 61a, 61b, 61c, 61d, 61e1, and 61e2.

Further, as illustrated in FIG. 24, FIG. 25, and FIG. 26, cooling structures 70A, 70B, and 70C may be provided for the respective housings 60. In the cooling structure 70A illustrated in FIG. 24, a heat dissipation plate 71 is disposed on a rear face of the housing 60, and a heat pipe 72 including a heat dissipation fin 73 at the tip of the heat pipe 72 is attached to the heat dissipation plate 71. The cooling structure 70A absorbs heat of the housing 60 by means of the heat dissipation plate 71, dissipates the resultant heat by the heat dissipation fin 73 through the heat pipe 72, and cools air inside the housing 60. In the cooling structure 70B illustrated in FIG. 25, a water cooling jacket 74 is disposed on the rear face of the housing 60. The water cooling jacket 74 is provided with, for example, a passage therein, absorbs heat of the housing 60 during a period from the injection of a refrigerant from an inlet 74A until the discharge of the refrigerant from an outlet 74B through the passage therein, and thereby cools air inside the housing 60. It is to be noted that, as illustrated in FIG. 24 and FIG. 25, in a case of where the cooling structure 70A or 70B is disposed on the rear face of the housing 60, the heat exchange fin 61 may not be extended to the outside of the housing 60. As illustrated in FIG. 20, etc., in a case where the heat exchange fin 61 is extended to the outside of the housing 60, the cooling structure 70C to which the heat pipe 72 having the heat dissipation fin 73 at its tip is coupled may be provided at an extended part of the heat exchange fin 61.

It is to be noted that the present embodiment gives an example in which the housing 60 has a sealed structure. However, the present disclosure is not limited thereto, and may have an open structure.

7. Application Examples

Next, a description is given, with reference to FIG. 27, of the projector 10 provided with the light source unit 100 including the phosphor wheel 1. FIG. 27 is a schematic diagram illustrating an overall configuration of the projector 10 including the light source unit 100 as a light source optical system. It is to be noted that a description is given below by exemplifying a reflection-type-3LCD-system projector that performs light modulation by a reflection type liquid crystal panel (LCD). However, the phosphor wheel 1 may be applicable to a projector using a digital micro-mirror device (DMD: Digital Micro-Mirror Device), a transmissive liquid crystal panel, or the like, in place of a reflection type liquid crystal panel.

As illustrated in FIG. 27, the projector 10 includes, in order, the above-described light source unit 100, an illumination optical system 200, an image forming section 300, and a projection optical system 400 (a projection optical system).

The illumination optical system 200 includes, for example, from a position close to the light source unit 100, fly-eye lenses 210 (210A and 210B), a polarization conversion element 220, a lens 230, dichroic mirrors 240A and 240B, reflection mirrors 250A and 250B, lenses 260A and 260B, a dichroic mirror 270, and polarizing plates 280A to 280C.

The fly-eye lenses 210 (210A and 210B) allow for uniformity of an illuminance distribution of white color light derived from the lens 65 of the light source unit 100. The polarization conversion element 220 so functions as to arrange a polarization axis of incident light in a predetermined direction. For example, the polarization conversion element 220 converts light other than P-polarized light into the P-polarized light. The lens 230 condenses light derived from the polarization conversion element 220 toward the dichroic mirrors 240A and 240B. The dichroic mirrors 240A and 240B selectively reflect light in a predetermined wavelength region and selectively transmit therethrough light in wavelength regions other than the light of the predetermined wavelength region. For example, the dichroic mirror 240A reflects mainly red color light in a direction of the reflection mirror 250A. In addition, the dichroic mirror 240B reflects mainly blue color light in a direction of the reflection mirror 250B. Accordingly, mainly green color light is transmitted through both of the dichroic mirrors 240A and 240B and travels toward a reflection type polarizing plate 310C (described later) of the image forming section 300. The reflection mirror 250A reflects light (mainly the red color light) derived from the dichroic mirror 240A toward the lens 260A and the reflection mirror 250B reflects light (mainly the blue color light) derived from the dichroic mirror 240B toward the lens 260B. The lens 260A transmits therethrough light (mainly, the red color light) derived from the reflection mirror 250A and condenses the light to the dichroic mirror 270. The lens 260B transmits therethrough light (mainly the blue color light) derived from the reflection mirror 250B, and condenses the light to the dichroic mirror 270. The dichroic mirror 270 selectively reflects the green color light and selectively transmits therethrough light in wavelength regions other than the green color light. Here, the dichroic mirror 270 transmits therethrough a red color light component in the light derived from the lens 260A. In a case where a green color light component is contained in the light derived from the lens 260A, the dichroic mirror 270 reflects the green color light component toward the polarizing plate 280C. The polarizing plates 280A to 280C include polarizers each having a polarization axis in a predetermined direction. For example, in a case where light is converted into P-polarized light by the polarization conversion element 220, the polarizing plates 280A to 280C transmit the P-polarized light therethrough and reflect S-polarized light.

The image forming section 300 includes reflection type polarizing plates 310A to 310C, reflection type liquid crystal panels 320A to 320C, and a dichroic prism 330.

The reflection type polarizing plates 310A to 310C each transmit therethrough light (for example, the P-polarized light) of a polarization axis that is the same as the polarization axis of the polarized light derived from each of the polarizing plates 280A to 280C, and reflect light (the S-polarized light) of polarization axes other than the P-polarized light. Specifically, the reflection type polarizing plate 310A transmits red color light of the P-polarized light derived from the polarizing plate 280A in a direction of the reflection type liquid crystal panel 320A. The reflection type polarizing plate 310B transmits blue color light of the P-polarized light derived from the polarizing plate 280B in a direction of the reflection type liquid crystal panel 320B. The reflection type polarizing plate 310C transmits green color light of the P-polarized light derived from the polarizing plate 280C in a direction of the reflection type liquid crystal panel 320C. In addition, the green color light of the P-polarized light that has been transmitted through both of the dichroic mirrors 240A and 240B and has entered the reflection type polarizing plate 310C is transmitted through the reflection type polarizing plate 310C and enters the dichroic prism 330 as it is. Further, the reflection type polarizing plate 310A reflects the red color light of the S-polarized light derived from the reflection type liquid crystal panel 320A and makes the light enter the dichroic prism 330. The reflection type polarizing plate 310B reflects the blue color light of the S-polarized light derived from the reflection type liquid crystal panel 320B and makes the light enter the dichroic prism 330. The reflection type polarizing plate 310C reflects the green color light of the S-polarized light derived from the reflection type liquid crystal panel 320C and makes the light enter the dichroic prism 330.

The reflection type liquid crystal panels 320A to 320C perform spatial modulation of the red color light, the blue color light, and the green color light, respectively.

The dichroic prism 330 synthesizes together the incident red color light, blue color light, and green color light, and outputs synthesized light toward the projection optical system 400.

The projection optical system 400 includes lenses L410 to L450 and a mirror M400. The projection optical system 400 enlarges outgoing light derived from the image forming section 300, and projects the light onto, for example, a screen (not illustrated).

(Operations of Light Source Unit and Projector)

Next, a description is given of an operation of the projector 10 including the light source unit 100 with reference to FIG. 11 and FIG. 27.

First, in the light source unit 100, the motors 20 and 122 are driven to rotate the phosphor wheel 1 and the diffusion plate 121. Thereafter, the excitation light EL1 is oscillated from the first laser group 110A at the light source section 110, and the blue color light EL2 is oscillated from the second laser group 110B at the light source section 110.

The excitation light EL1 is oscillated from the first laser group 110A, following which the excitation light EL1 is transmitted through the lens 63, the dichroic mirror 67, and the lens 64, in order. Thereafter, the excitation light EL1 is applied to the phosphor layer 12 of the phosphor wheel 1. The phosphor layer 12 of the phosphor wheel 1 partially absorbs the excitation light EL1, thus converting the absorbed light into the fluorescence FL1, which is yellow color light, and emitting the fluorescence FL1 toward the lens 64. The fluorescence FL1 is reflected by the dichroic mirror 67, following which the fluorescence FL1 is transmitted through the lens 65 and travels toward the illumination optical system 200.

The blue color light EL2 is oscillated from the second laser group 110B, travels via the reflection mirror 68, and thereafter, is applied to the diffusion plate 121. The diffusion plate 121 diffuses the blue color light EL2, and outputs the diffused light toward the lens 66. The blue color light EL2 is transmitted through the dichroic mirror 67, following which the light is transmitted through the lens 65 and travels toward the illumination optical system 200.

In this way, the light source unit 100 synthesizes the fluorescence FL (FL1), which is the yellow color light, with the blue color light (EL2), and make resulting white color light enter the illumination optical system 200.

The white color light derived from the light source unit 100 is sequentially transmitted through the fly-eye lenses 210 (210A and 210B), the polarization conversion element 220, and the lens 230, and thereafter reaches the dichroic mirrors 240A and 240B.

Mainly the red color light is reflected by the dichroic mirror 240A, and the red color light is sequentially transmitted through the reflection mirror 250A, the lens 260A, the dichroic mirror 270, the polarizing plate 280A, and the reflection type polarizing plate 310A, and reaches the reflection type liquid crystal panel 320A. The red color light is spatially modulated at the reflection type liquid crystal panel 320A, following which the spatially-modulated red color light is reflected by the reflection type polarizing plate 310A and enters the dichroic prism 330. It is to be noted that, in a case where the green color light component is contained in the light that has been reflected by the dichroic mirror 240A to the reflection mirror 250A, the green color light component is reflected by the dichroic mirror 270 to be sequentially transmitted through the polarizing plate 280C and the reflection type polarizing plate 310C and reaches the reflection type liquid crystal panel 320C. Mainly the blue color light is reflected by the dichroic mirror 240B and enters the dichroic prism 330 through a similar process. The green color light that has been transmitted through the dichroic mirrors 240A and 240B also enters the dichroic prism 330.

The red color light, the blue color light, and the green color light that have entered the dichroic prism 330 are synthesized together and thereafter outputted toward the projection optical system 400 as image light. The projection optical system 400 enlarges the image light derived from the image forming section 300 and projects the light onto, for example, the screen (not illustrated).

In this way, the light source unit 100 of the present disclosure includes the above-described phosphor wheel 1. Accordingly, it is possible to obtain light emission having higher illuminance. Further, the projector 10 of the present disclosure includes the light source unit 100 having the above-described phosphor wheel 1. Accordingly, it is possible to achieve superior display performance.

Further, as the projection display apparatus according to the present technology, an apparatus other than the above-described projector may be configured. Further, the light source unit according to the present technology may be used for an apparatus that is not a projection display apparatus. For example, the light source unit 100 of the present disclosure may be used as illumination applications, and is applicable to, for example, a head lamp for a vehicle or a light source for illumination.

8. Examples

Various types of phosphor wheels were fabricated for experimental examples. An experimental example 1 is a general phosphor wheel prepared by mixing phosphor particles with a binder to thereby fixedly form a phosphor layer on a wheel substrate, without a glass heat sink or a wheel heat sink. An experimental example 2 is a binderless phosphor wheel and has a configuration in which a phosphor layer including phosphor particles is provided between a pair of bases (a wheel substrate and a cover glass). In addition, a general heat sink without a slit or a plurality of fins as described in the above embodiments, etc., is provided around the wheel substrate and the cover glass. An experimental example 3 is a phosphor wheel in which the glass holder heat sink 16 having fins 16*b* at the periphery in the above-described embodiment is provided around the cover glass 13, in addition to the configuration of the experimental example 2. Further, an outer spacer having a plurality of slits formed at the periphery is provided at the peripheral edge of the wheel substrate. An experimental example 4 is a phosphor wheel in which the wheel heat sink 15 having an offset structure is provided around the wheel substrate 11, in addition to the structure of the experimental example 3.

First, phosphor temperatures upon application of excitation light of each of the experimental example 1 to the experimental example 4 were measured. FIG. 28 lists the results. In a case where the phosphor temperature in the general phosphor wheel (the experimental example 1) in which a formation body layer was formed with a binder was set as a criterion, a reduction by −14.5° C. was confirmed in the experimental example 2. Further, a reduction by −22.1° C. was confirmed in the experimental example 3, and a reduction by −41.8° C. was confirmed in the experimental example 4. It is to be noted that, as the phosphor temperature decreases by 10° C., the conversion efficiency from excitation light into fluorescence in a phosphor layer improves by about 5% in terms of the highest luminance. Further, as the phosphor temperature decreases by 40° C., the conversion efficiency from the excitation light into the fluorescence upon the application of the same excitation light improves by about 6% to about 9%, and the highest illuminance improves by about 20%.

Next, variations in illumination system outputs in relation to excitation light outputs in the experimental example 1 and the experimental example 4 were examined. FIG. 29 illustrates the illumination system outputs in relation to the excitation light outputs in the experimental example 1 and the experimental example 4. It is to be noted that the above-described illumination system outputs are each a radiant flux (W) that enters a reflection-type panel, and each in proportion to a light flux (lm). In a case of applying excitation light having the same output in the experimental example 1 and the experimental example 4, the improvement in the illumination system output was confirmed in the experimental example 4. Specifically, for example, the illumination system output upon application of excitation light having an output of 180.8 W was 37.5 W in the experimental example 1 while the output was 40 W in the experimental example 4, achieving the improvement by 7%. The illumination system output upon application of excitation light having an output of 192.1 W was 37.8 W in the experimental example 1 while the output was 41.3 W in the experimental example 4, achieving the improvement by 9%. Further, when comparing the experimental example 1 with the experimental example 4 in terms of the highest illuminance, the illumination system output upon application of excitation light having an output of 192.1 W was 37.8 W in the experimental example 1 while the illumination system output upon application of excitation light having an output of 254.2 W was 45.4 W in the experimental example 4, achieving the improvement by 20%.

As can be appreciated from the results above, it is found that improving the heat dissipation performance of the heat dissipation path through the cover glass makes it possible to significantly improve the cooling efficiency of the phosphor layer. It is further found that causing the fins provided at the heat sink to have an offset fin structure makes it possible to significantly improve the cooling efficiency and significantly improve the conversion efficiency from excitation light to fluorescence.

As described, the present disclosure has been described by way of the first to fourth embodiments, the modification examples 1 and 2, and the Examples. However, the present disclosure is not limited to the above-described embodiments, etc., and may be variously modified. For example, the material of each layer, the thickness, and the like, that have been described in the above-described embodiments are merely exemplary, and not limited thereto, and other materials and thicknesses may be adopted.

Further, the reflection-type phosphor wheel 1 is described as an example in the above-described embodiments, etc. However, the above-described embodiments, etc. are also applicable to a transmissive phosphor wheel. In a case of the transmissive phosphor wheel, a glass holder heat sink and a wheel heat sink are so disposed as not to interrupt an optical path.

Further, the glass holder heat sinks 16 and 56 are provided at the periphery that is outside the cover glass 13 in the above-described embodiments, etc. However, the glass holder heat sinks 16 and 56 may be provided on side of the opening 13H in the middle of the cover glass 13, for example. In such a case, the plurality of fins 16*b* and 56*b* are formed along the respective inner edges of the glass holder heat sinks 16 and 56.

Moreover, the side face of the phosphor layer 12 is sealed using the gaskets 18A and 18B in the above-described first embodiment. However, this is not limitative. For example, in a case where linear expansion coefficients of the cover glass 13 and the outer spacer 14 are the same as each other, sealing may be performed using an adhesive. Further, even in a case where the linear expansion coefficients of the cover glass 13 and the outer spacer 14 are different from each other, sealing may be performed using such an adhesive in a case where deformation, warpage, or the like is mendable with such an adhesive. Further, the single wheel heat sink 15 is provided for the wheel substrate 11 in the above-described embodiments. However, this is not limitative, and, for example, two wheel heat sinks may be so combined as to be provided for the wheel substrate 11.

It is to be noted that the present technology may adopt the following configurations.

(1)

A light source unit including:
a light source section; and
a light-emitting device that is excited by light derived from the light source unit and emits fluorescence,
the light-emitting device including
a first base,
a phosphor layer provided on one face of the first base, and
a first heat dissipation member provided at the first base,
the first heat dissipation member including a plurality of fins disposed to be spaced apart along a periphery.

(2)

The light source unit according to (1), in which
the first heat dissipation member includes a first fin and a second fin as the plurality of fins, and
the first fin and the second fin have a difference in level from each other.

(3)

The light source unit according to (2), in which the first fin and the second fin are disposed alternately along the periphery of the first heat dissipation member.

(4)

The light source unit according to any one of (1) to (3), in which
the first base has a disk shape,
the first heat dissipation member has a disk shape and is provided at the periphery of the first base, and
the plurality of fins are provided along an outer circumference of the first heat dissipation member.

(5)

The light source unit according to any one of (1) to (4), in which the plurality of fins each have, on a surface, one or more irregular structures.

(6)

The light source unit according to any one of (1) to (5), in which the light-emitting device includes a second heat dissipation member provided on another face of the first base, the other face of the first base being opposite to the one face of the first base.

(7)

The light source unit according to (6), in which the second heat dissipation member includes a plurality of fins disposed to be spaced apart along a periphery.

(8)

The light source unit according to (7), in which
the second heat dissipation member includes a third fin and a fourth fin as the plurality of fins, and
the third fin and the fourth fin have a difference in level from each other.

(9)

The light source unit according to any one of (1) to (8), in which the light-emitting device includes a second base that is disposed to face the first base with the phosphor layer interposed therebetween.

(10)

The light source unit according to (9), in which the second base includes a third heat dissipation member provided on a face that is opposite to the phosphor layer.

(11)

The light source unit according to (10), in which the third heat dissipation member includes a plurality of fins disposed to be spaced apart along a periphery.

(12)

The light source unit according to (11), in which
the third heat dissipation member includes a fifth fin and a sixth fin as the plurality of fins, and
the fifth fin and the sixth fin have a difference in level from each other.

(13)

The light source unit according to any one of (1) to (12), in which
the light-emitting device includes the first heat dissipation member that is provided at a periphery of the first base and includes a first fin and a second fin, the first fin and the second fin having a difference in level from each other, and
a second heat dissipation member that is provided on another face of the first base, the other face of the first base being opposite to the one face of the first base, the second heat dissipation member including a third fin and a fourth fin, the third fin and the fourth fin having a difference in level from each other, and
the first fin, the third fin, the second fin, and the fourth fin are disposed in this order in a cross-sectional view.

(14)

The light source unit according to any one of (1) to (13), in which
the light-emitting device includes
the first heat dissipation member that is provided at a periphery of the first base and includes a first fin and a second fin, the first fin and the second fin having a difference in level from each other, and
a third heat dissipation member that is provided on a face of a second base, the face of the second base being opposite to the phosphor layer, the third heat dissipation member including a fifth fin and a sixth fin, the fifth fin and the sixth fin having a difference in level from each other, the second base being disposed to face the first base with the phosphor layer interposed therebetween, the second base being provided on a face opposite to the phosphor layer, and
the fifth fin, the sixth fin, the first fin, and the second fin are disposed in this order in a cross-sectional view.

(15)

The light source unit according to any one of (1) to (14), in which
the light-emitting device includes a second heat dissipation member provided on another face of the first base, the other face of the first base being opposite to the one face of the first base, and
a first heat exchange fin is disposed between the first heat dissipation member and the second heat dissipation member.

(16)

The light source unit according to (15), in which
the light-emitting device includes the first heat dissipation member, the second heat dissipation member, and a third heat dissipation member, the second heat dissipation member being provided on another face of the first base, the other face of the first base being opposite to the one face of the first base, the third heat dissipation member being provided on a face of a second base, the face of the second base being opposite to the phosphor layer, the third heat dissipation member including a fifth fin and a sixth fin, the fifth fin and the sixth fin having a difference in level from each other, the second base being disposed to face the first base with the phosphor layer interposed therebetween, the second base being provided on a face opposite to the phosphor layer,
the first heat dissipation member includes a first fin and a second fin, the first fin and the second fin having a difference in level from each other, the second heat dissipation member includes a third fin and a fourth fin, the third fin and the fourth fin having a difference in level from each other, the third heat dissipation member includes the fifth fin and the sixth fin, the fifth fin and the sixth fin having the difference in level from each other, a second heat exchange fin is disposed between the first fin and the second fin, a third heat exchange fin is disposed between the third fin and the fourth fin, and a fourth heat exchange fin is disposed between the fifth fin and the sixth fin.

(17)

The light source unit according to (16), in which a fifth heat exchange fin is disposed on side of the second heat dissipation member, the side of the second heat dissipation member being opposite to the first base, and a sixth heat exchange fin is disposed on side of the third heat dissipation member, the side of the third heat dissipation member being opposite to the phosphor layer of the second base.

(18)

The light source unit according to (17), in which the light-emitting device is included in a housing, and the first heat exchange fin, the second heat exchange fin, the third heat exchange fin, the fourth heat exchange fin, the fifth heat exchange fin, and the sixth heat exchange fin are held by the housing.

(19)

A projection display apparatus including:

a light source optical system including a light source section and a light-emitting device; an image generation optical system that generates image light by modulating, on the basis of an inputted image signal, light derived from the light source optical system; and a projection optical system that projects the image light generated by the image generation optical system, the light-emitting device including a light source section, and a light-emitting device that is excited by light derived from the light source unit and emits fluorescence, the light-emitting device including a first base, a phosphor layer provided on one face of the first base, and a first heat dissipation member provided at the first base, the first heat dissipation member including a plurality of fins disposed to be spaced apart along a periphery.

This application claims the benefit of Japanese Priority Patent Application JP2016-205217 filed with the Japan Patent Office on Oct. 19, 2016, and Japanese Priority Patent Application JP2017-070187 filed with the Japan Patent Office on Mar. 31, 2017, the entire contents of both of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light source unit, comprising:
a light source section; and
a light-emitting device configured to emit fluorescence based on excitation of the light-emitting device by light derived from the light source unit, wherein
the light-emitting device includes:
a first base having a disk shape,
a phosphor layer on a first face of the first base, and
a first heat dissipation member at a periphery of the first base,
the first heat dissipation member has the disk shape,
the first heat dissipation member includes a first plurality of fins along an outer circumference of the first heat dissipation member, and
the first plurality of fins is spaced apart along the outer circumference of the first heat dissipation member.

2. The light source unit according to claim 1, wherein
the first heat dissipation member includes a first fin and a second fin as the first plurality of fins, and
the first fin and the second fin have a difference in level from each other.

3. The light source unit according to claim 2, wherein the first fin and the second fin are arranged alternately along a periphery of the first heat dissipation member.

4. The light source unit according to claim 1, wherein a surface of each of the first plurality of fins includes at least one irregular structure.

5. The light source unit according to claim 1, wherein
the light-emitting device further includes a second heat dissipation member on a second face of the first base, and
the second face of the first base is opposite to the first face of the first base.

6. The light source unit according to claim 5, wherein the second heat dissipation member includes a second plurality of fins spaced apart along a periphery of the second heat dissipation member.

7. The light source unit according to claim 6, wherein
the second heat dissipation member includes a third fin and a fourth fin as the second plurality of fins, and
the third fin and the fourth fin have a difference in level from each other.

8. The light source unit according to claim 1, wherein
the light-emitting device further includes a second base that faces the first base, and
the phosphor layer is between the first base and the second base.

9. The light source unit according to claim 8, wherein
the second base includes a third heat dissipation member on a face of the second base, and
the face of the second base is opposite to the phosphor layer.

10. The light source unit according to claim 9, wherein the third heat dissipation member includes a third plurality of fins spaced apart along a periphery of the third heat dissipation member.

11. The light source unit according to claim 10, wherein
the third heat dissipation member includes a fifth fin and a sixth fin as the third plurality of fins, and
the fifth fin and the sixth fin have a difference in level from each other.

12. The light source unit according to claim 1, wherein
the first plurality of fins of the first heat dissipation member includes a first fin and a second fin,
the first fin and the second fin have a difference in level from each other, the light-emitting device further includes a second heat dissipation member on a second face of the first base,
the second face of the first base is opposite to the first face of the first base,
the second heat dissipation member includes a third fin and a fourth fin,
the third fin and the fourth fin have a difference in level from each other, and
the first fin, the third fin, the second fin, and the fourth fin are in this order in a cross-sectional view.

13. The light source unit according to claim 1, wherein
the first plurality of fins of the first heat dissipation member includes a first fin and a second fin,
the first fin and the second fin have a difference in level from each other,
the light-emitting device further includes a second base and a third heat dissipation member on a face of the second base,
the face of the second base is opposite to the phosphor layer,
the third heat dissipation member includes a fifth fin and a sixth fin,
the fifth fin and the sixth fin have a difference in level from each other,
the second base faces the first base,
the phosphor layer is between the first base and the second base, and
the fifth fin, the sixth fin, the first fin, and the second fin are in this order in a cross-sectional view.

14. The light source unit according to claim 1, wherein
the light-emitting device further includes a second heat dissipation member on a second face of the first base,
the second face of the first base is opposite to the first face of the first base, and
the light source unit further includes a first heat exchange fin between the first heat dissipation member and the second heat dissipation member.

15. The light source unit according to claim 14, wherein
the light-emitting device further includes a second base and a third heat dissipation member on a face of the second base,
the face of the second base is opposite to the phosphor layer,
the third heat dissipation member includes a fifth fin and a sixth fin,
the fifth fin and the sixth fin have a difference in level from each other,
the second base faces the first base,
the phosphor layer is between the first base and the second base,
the first plurality of fins of the first heat dissipation member includes a first fin and a second fin,
the first fin and the second fin have a difference in level from each other,
the second heat dissipation member includes a third fin and a fourth fin,
the third fin and the fourth fin have a difference in level from each other, and
the light source unit further includes:
a second heat exchange fin between the first fin and the second fin,
a third heat exchange fin between the third fin and the fourth fin, and
a fourth heat exchange fin between the fifth fin and the sixth fin.

16. The light source unit according to claim 15, further comprising:
a fifth heat exchange fin on a side of the second heat dissipation member,
wherein the side of the second heat dissipation member is opposite to the first base, and
a sixth heat exchange fin on a side of the third heat dissipation member,
wherein the side of the third heat dissipation member is opposite to the phosphor layer of the second base.

17. The light source unit according to claim 16, wherein
the light-emitting device is in a housing, and
the first heat exchange fin, the second heat exchange fin, the third heat exchange fin, the fourth heat exchange fin, the fifth heat exchange fin, and the sixth heat exchange fin are held by the housing.

18. A projection display apparatus, comprising:
a light source optical system including:
a light source section, and
a light-emitting device configured to emit fluorescence based on excitation of the light-emitting device by light derived from the light source optical system, wherein
the light-emitting device includes:
a base having a disk shape,
a phosphor layer on a face of the base, and
a heat dissipation member at a periphery of the base,
the heat dissipation member has the disk shape,
the heat dissipation member includes a plurality of fins along an outer circumference of the heat dissipation member, and
the plurality of fins is spaced apart along the outer circumference of the heat dissipation member;
an image generation optical system configured to generate image light by modulation of the light derived from the light source optical system,
wherein the modulation of the light is based on an inputted image signal; and
a projection optical system configured to project the image light generated by the image generation optical system.

19. A light source unit, comprising:
a light source section;
a light-emitting device configured to emit fluorescence based on excitation of the light-emitting device by light derived from the light source unit, wherein
the light-emitting device includes:
a base,
a phosphor layer on a first face of the base,
a first heat dissipation member at the base, and
a second heat dissipation member on a second face of the base,
the second face of the base is opposite to the first face of the base, and
the first heat dissipation member includes a plurality of fins spaced apart along a periphery of the first heat dissipation member; and
a heat exchange fin between the first heat dissipation member and the second heat dissipation member.

* * * * *